(12) United States Patent
Shaffer et al.

(10) Patent No.: US 6,694,351 B1
(45) Date of Patent: Feb. 17, 2004

(54) CALL OPTIMIZATION IN MEET-ME CONFERENCE CALLS

(75) Inventors: Shmuel Shaffer, Palo Alto, CA (US); Charles J. Bedard, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 601 days.

(21) Appl. No.: 09/607,383

(22) Filed: Jun. 30, 2000

(51) Int. Cl.[7] .............................................. G06F 15/16
(52) U.S. Cl. ...................................................... 709/204
(58) Field of Search ................................. 709/204, 208, 709/223, 227

(56) References Cited

U.S. PATENT DOCUMENTS

| | | | | |
|---|---|---|---|---|
| 5,555,290 A | * | 9/1996 | McLead et al. ............... | 379/67 |
| 5,761,294 A | | 6/1998 | Shaffer et al. ............... | 379/230 |
| 5,848,142 A | * | 12/1998 | Yaker ......................... | 379/215 |
| 5,970,126 A | | 10/1999 | Bowater et al. ............. | 379/114 |
| 5,995,607 A | * | 11/1999 | Beyda et al. ................ | 379/202 |
| 6,035,026 A | * | 3/2000 | Kim ............................ | 379/202 |
| 6,141,406 A | * | 10/2000 | Johnson ...................... | 379/189 |
| 6,195,117 B1 | * | 2/2001 | Miyazaki .................... | 345/15 |
| 6,434,126 B1 | * | 8/2002 | Park ........................... | 370/128 |

* cited by examiner

Primary Examiner—David Y. Eng
(74) Attorney, Agent, or Firm—Campbell Stephenson Ascolese LLP

(57) ABSTRACT

A method for joining a meet-me conference call includes establishing a Call Optimization Application (COA) channel between a Multipoint Controller-Call Optimization Application (MC-COA) and a Call Optimization Application co-resident with the terminal (Terminal-COA) following an address resolution, in response to an application program co-resident with a terminal receiving a request to join an ongoing meet-me conference call; receiving, over the COA channel, a first message from the MC-COA as to whether the meet-me conference call is still ongoing; and in response to the first message indicating that the meet-me conference call is no longer ongoing, giving notification that the meet-me conference call is no longer ongoing.

44 Claims, 29 Drawing Sheets

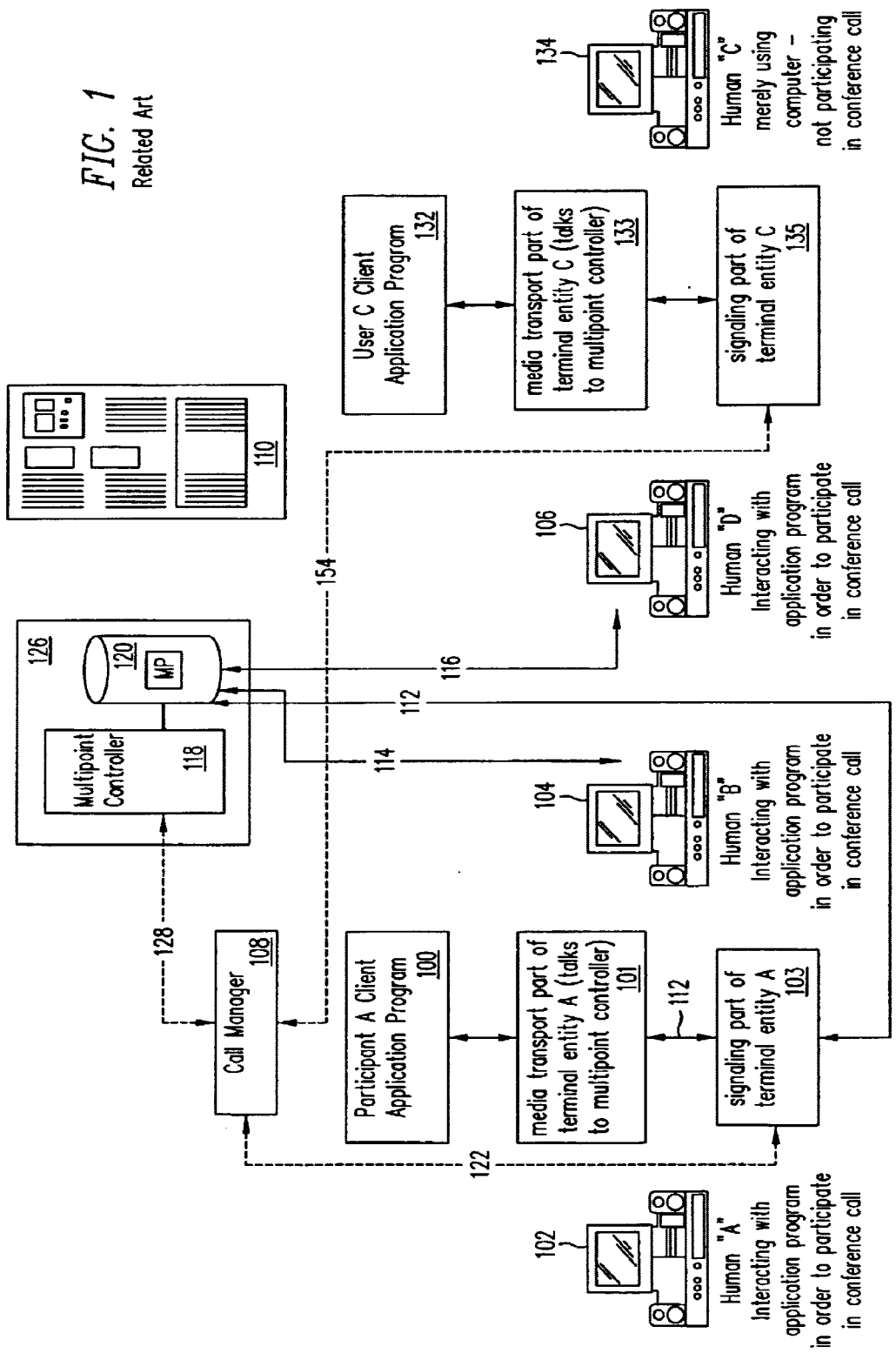

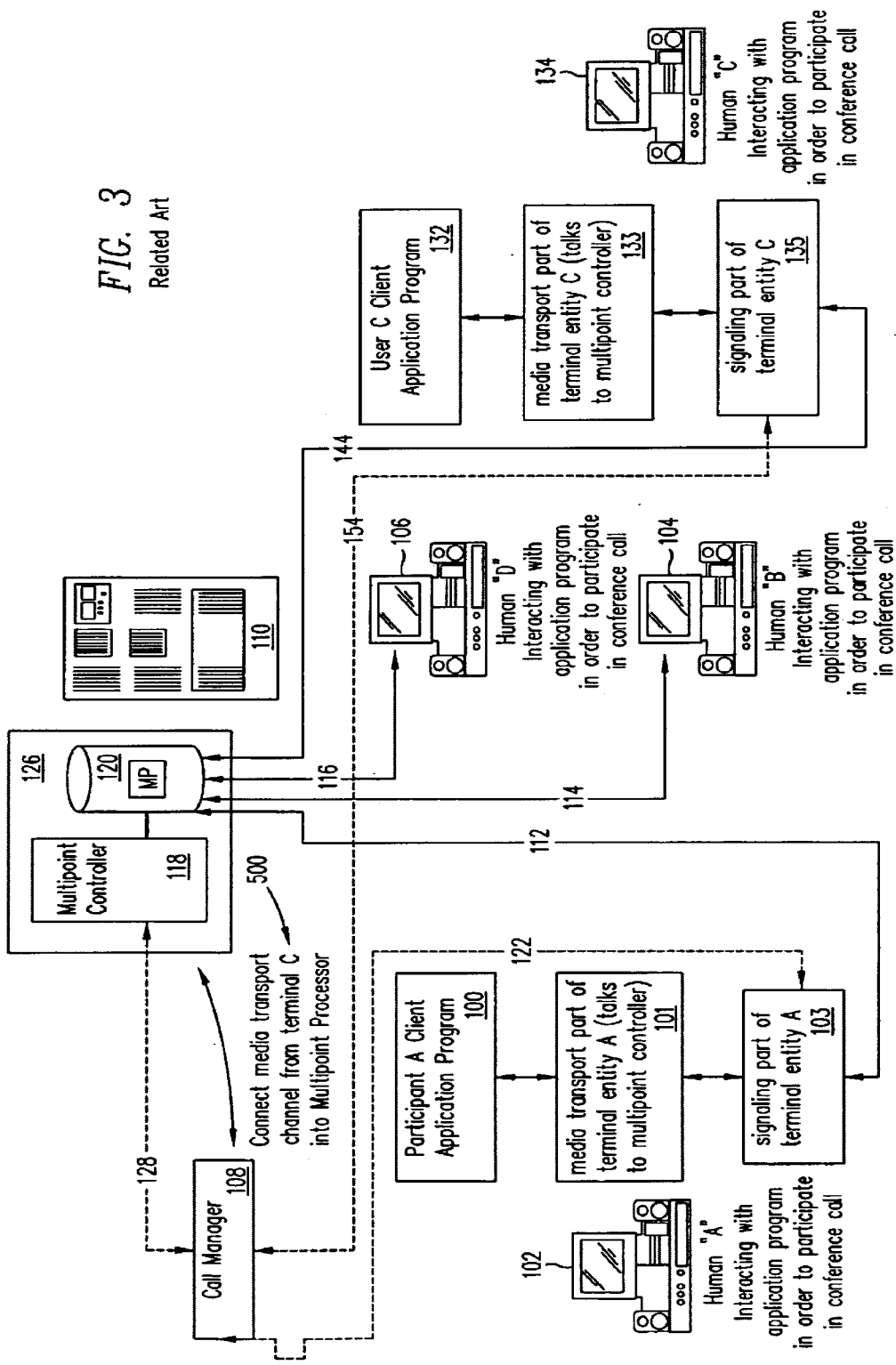

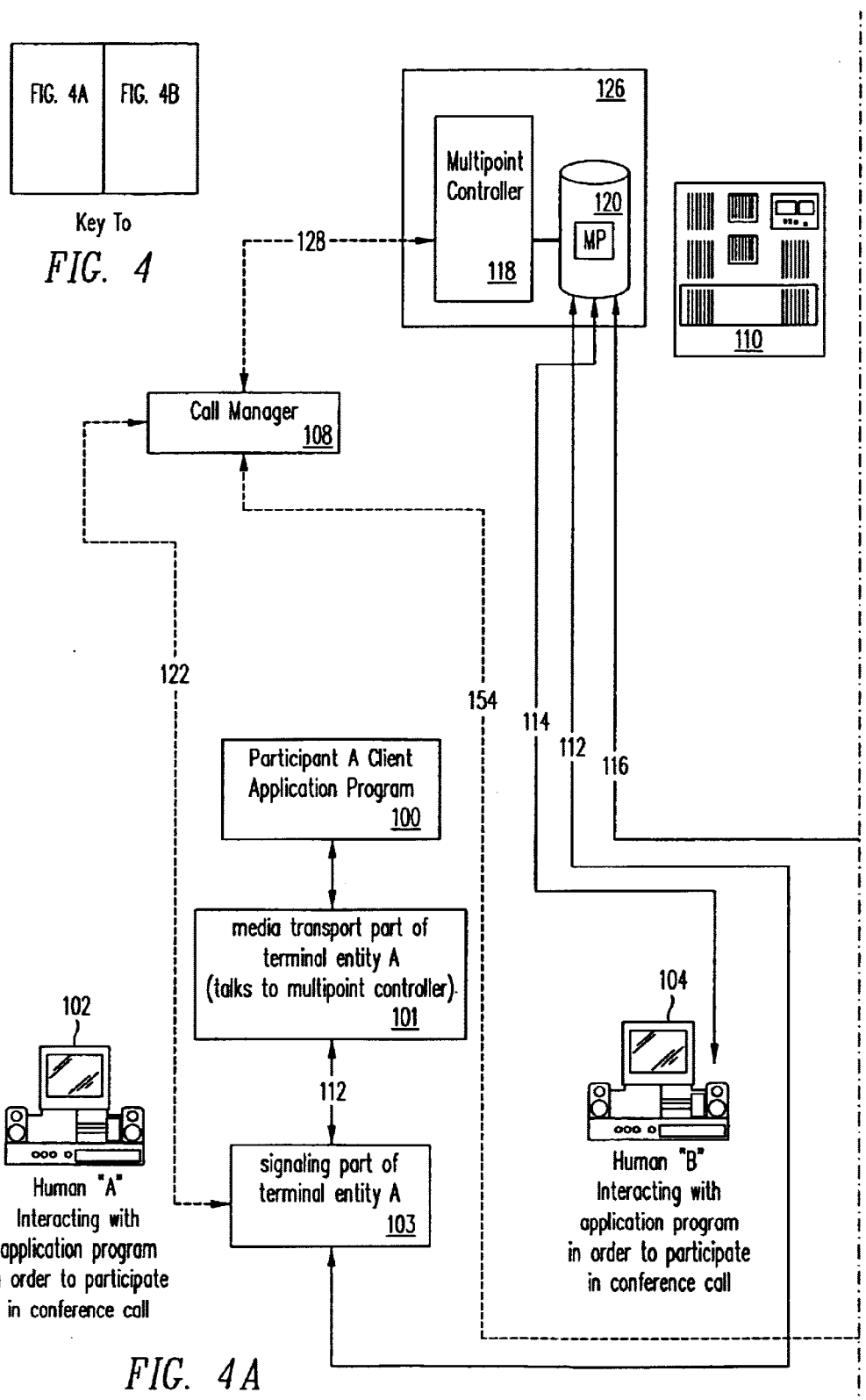

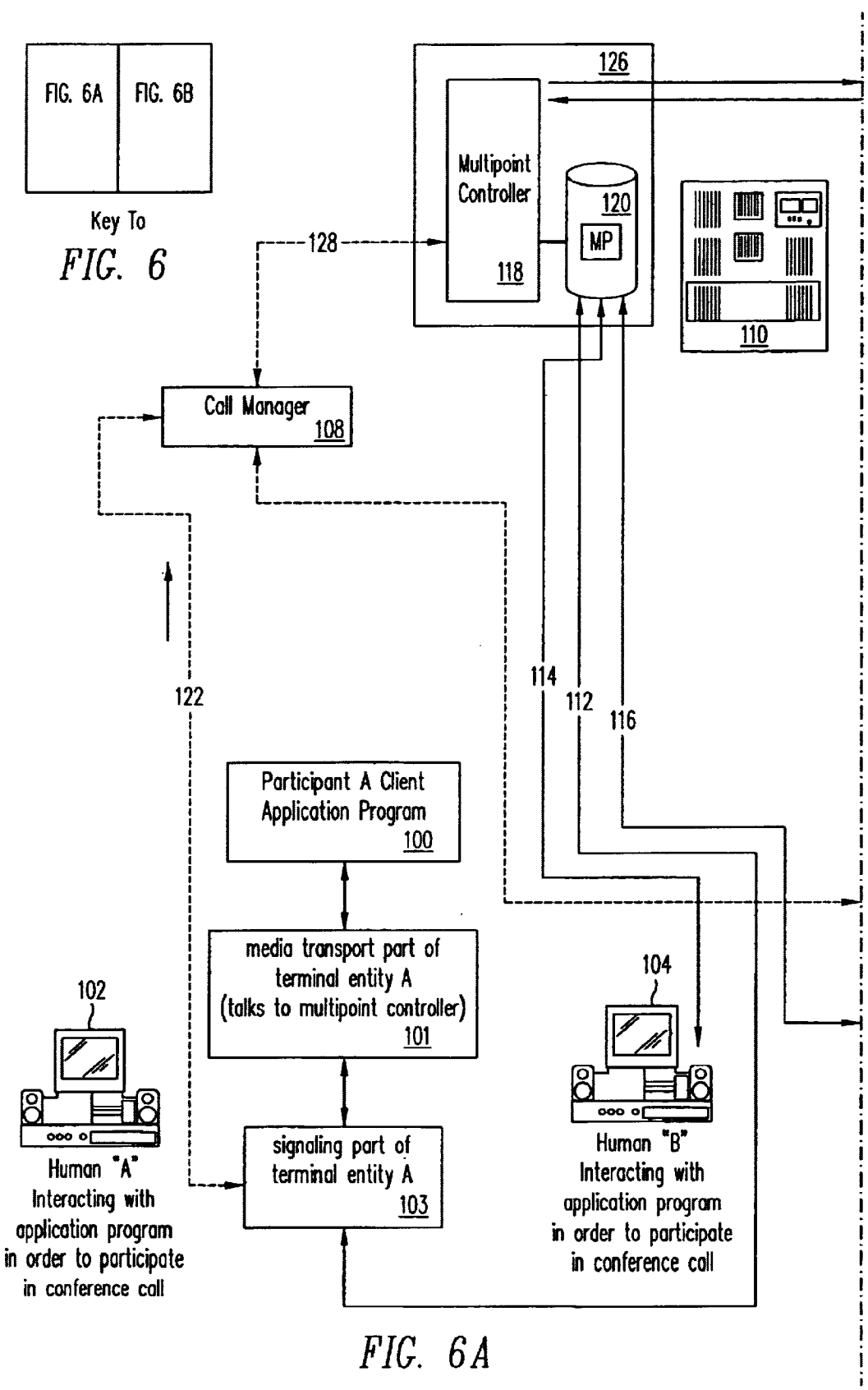

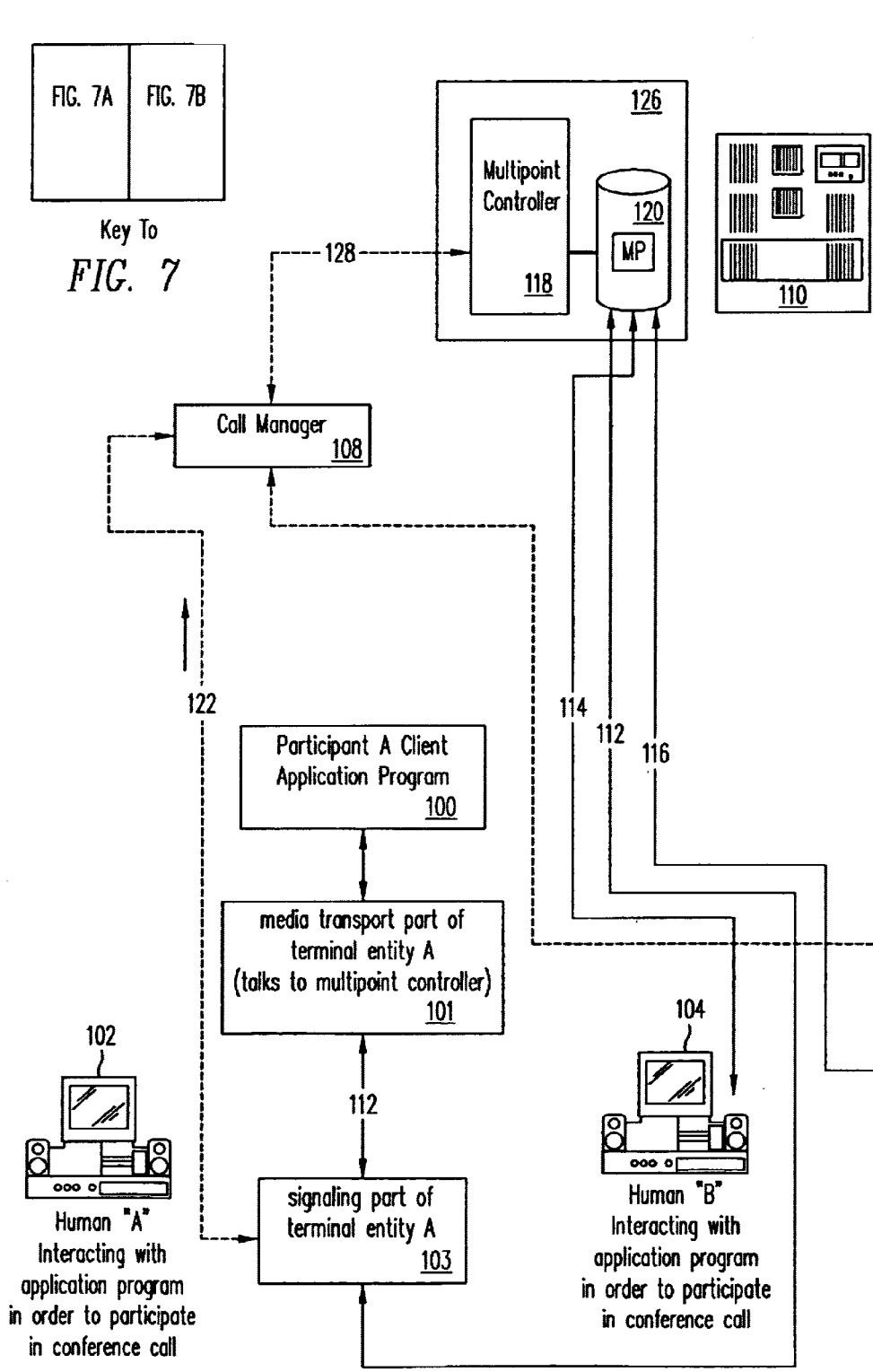

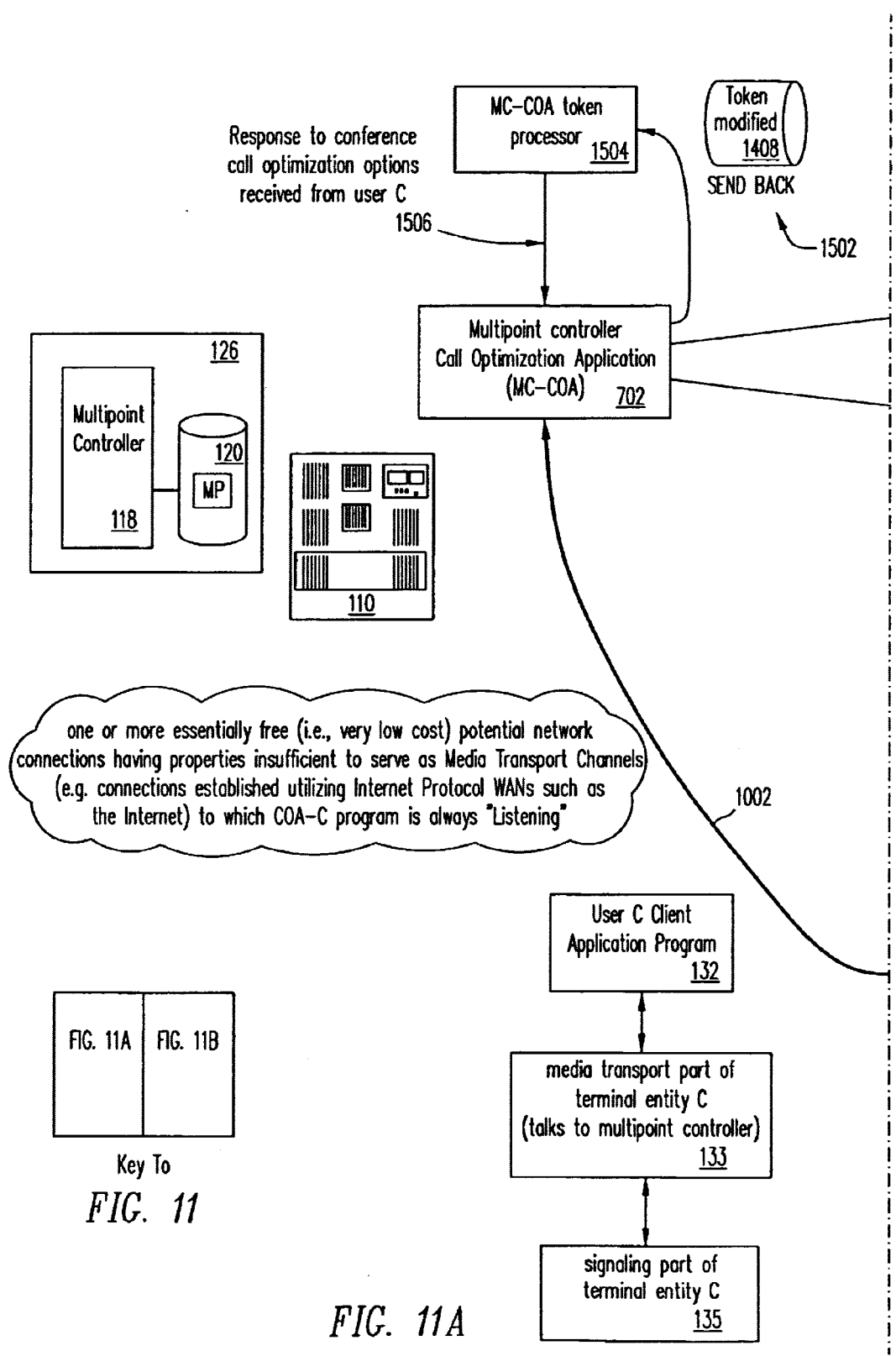

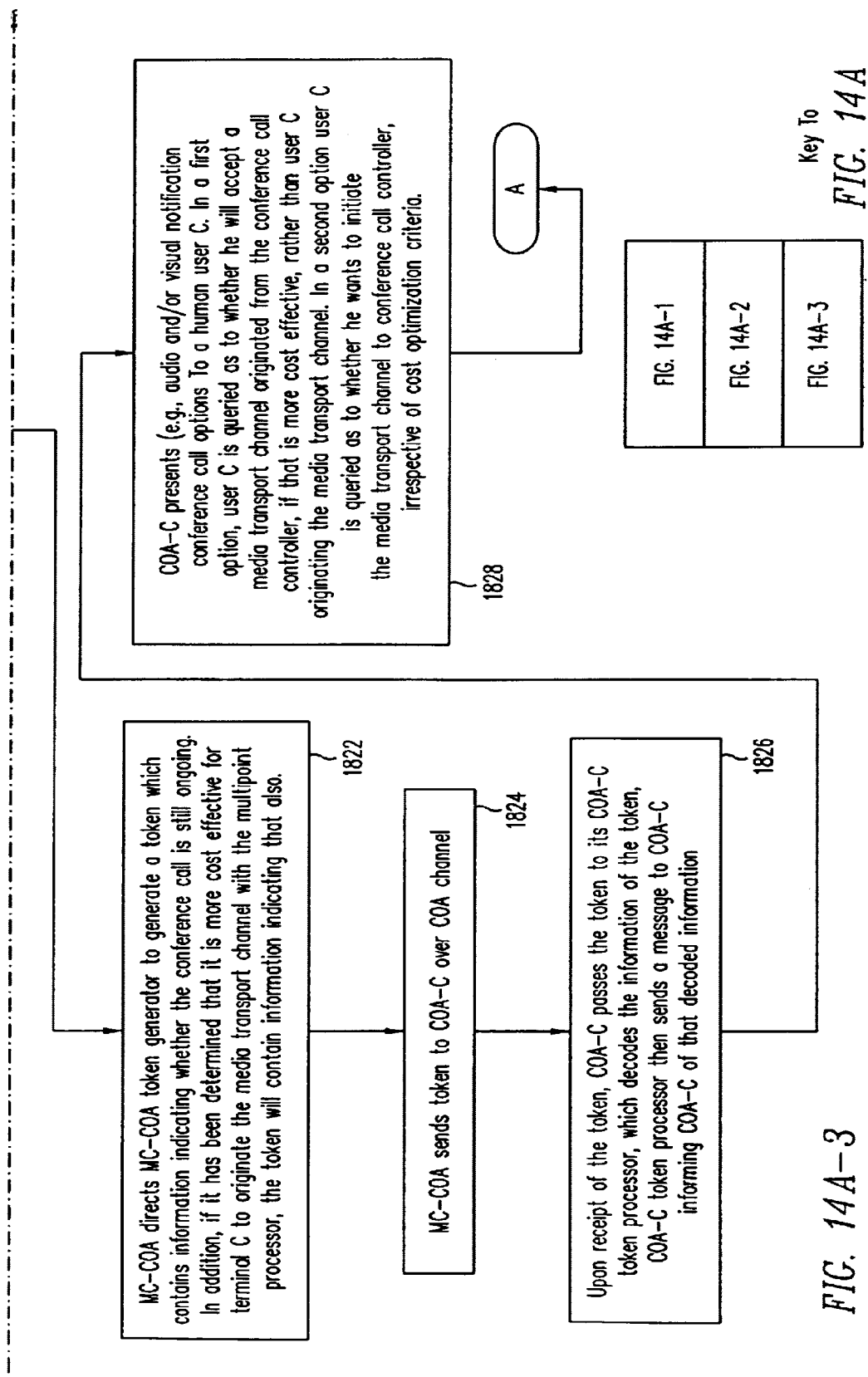

CALL OPTIMIZATION IN MEET-ME CONFERENCE CALLS

BACKGROUND OF THE INVENTION

The present invention is related to a method and system to be utilized in at least one data communications network wherein conference calls are established.

DESCRIPTION OF THE RELATED ART

A data communications network is the interconnection of two or more communicating entities (i.e., data sources and/or sinks) over one or more data links. A data communications network allows communication between multiple communicating entities over one or more data communications links.

A data communications network can be used to support a conference call. With reference now to FIG. 1, shown is a data communications network in a conference call configuration. Depicted are three humans A, B, and D interacting with application programs on computers 102, 104, and 106 in order to participate in a conference call. The interaction with the application programs typically involves the utilization of microphones, speakers, keyboards, and/or graphical user interfaces on computers 102, 104, and 106 (e.g., when a user speaks into a microphone and listens to a speaker of a computer where an application program is resident and running). For sake of clarity, only conferenced-in computer 102 is explicitly shown as having application programs 100, 101, and 103, but it is to be understood that similar application programs are present on computers 104 and 106, although such additional application programs are not shown.

For sake of illustration, the discussion herein depicts and describes logical entities as if they are application programs running on computers. For example, multipoint controller 118 and multipoint processor 120 are depicted and described as if they are subprograms of conferencing engine 126 which is itself depicted and described as a program resident within and running on network computer 110; participant A client application program 100, media transport part 101 of terminal entity A, and signaling part 103 of terminal entity A are depicted and described as if they are programs resident within and running on computer 102; and user C client application program 132, media transport part 133 of terminal entity C, and signaling part 135 of terminal entity C are depicted and described as if they are programs resident within and running on computer 134. However, those skilled in the art will appreciate that such treatment is merely illustrative and that the logical entities depicted and described herein may be implemented as hardware or any combination of hardware and software (e.g., in one implementation multipoint processor 120 is actually a stand-alone processor). In addition to the foregoing, those skilled in the art will appreciate that the fact that media transport channels are depicted herein as passing through signalling parts of terminals (e.g., signalling part 103 of terminal A) prior to terminating on media transpart parts of terminals (e.g., media transport part 101 of terminal entity A) as an indication that such channels are generally physically transmitted through network interface cards.

Illustrated is that media (e.g., audio or visual data presented to human users A, B, and D through their respective applications programs) exchanged between the application programs of conference call participants A, B, and D are carried by media transport channels 112, 114, and 116. As used herein, media transport channels refer to channels sufficient to meet defined media data transmission needs for individual conference calls. Those skilled in the art will recognize that the definition of such media data transmission needs can be pre-set by a particular data communications system, or can be set and/or reset by one or more conference call participants at call initiation and/or during a conference call. That is, as used herein the term "media transport channel" refers to a data communications channel sufficient to substantially meet such user media transmission requirements.

Media transport channels 112, 114, and 116 respectively connect individual media transport parts of terminal entities, resident on computers 102, 104, and 106, with multipoint processor 120. However, for sake of clarity only media transport part 101 of terminal entity A of computer 102 is shown, but it is to be understood that similar media transport parts are present on computers 104 and 106, although such media transport parts are not shown. Multipoint processor 120 is a conferencing engine 126 component that ensures that data is appropriately mixed and sent to various participants engaging in the conference call (e.g., data received over media transport channel 112 is mixed and sent out over media transport channels 114 and 116).

The establishment of media transport channels such as media transport channels 112, 114, and 116 is managed by call manager 108. Call manager 108 establishes and tears down media transport channels in response to call management signals sent to call manager 108 by multipoint controller 118, and signaling parts of terminal entities located within computers 102, 104, and 106. For ease of illustration, only one signaling part of a terminal entity (i.e., signaling part 103 of terminal entity A resident within computer 102) is shown, but it is to be understood that similar signaling parts are present on computers 104 and 106, although such signaling parts are not shown.

With reference now to FIG. 2, shown is event 300 wherein, in response to dial tone presented by call manager 108, human user C inputs (e.g., by a numeric keypad of computer 134) the previously-assigned (in meet-me conference calls, the human user typically knows the phone number and the password associated with the meet-me conference in advance) telephone number of the conference call service maintained by multipoint controller 118, into user C client application program 132. In response, user C client application program 132 causes signaling part 133 of terminal entity C to send message 302 to call manager 108 wherein call manager 108 is informed of the telephone number of the conference call service maintained by multipoint controller 118. In response, call manager 108 sends message 304, over call management signaling channel 128, to multipoint controller 118 directing that multipoint controller 118 accept a media transport channel originating from media transport part 133 of terminal entity C.

Depicted is that, in response to message 304, media transport channel 144 is established with multipoint controller 118. Subsequent to the establishment of media transport channel 144, illustrated is event 310 of multipoint controller 118 answering (e.g., via human speech created by a speech synthesizer) "please enter your conference call password." In response, shown is event 312 of user C client application program 132 answering back with the previously-assigned password for the conference call, which is typically entered by human user C via one or more input devices of computer 134.

With reference now to FIG. 3, depicted is that, assuming the conference call associated with receipt of the password entered by human user C is still ongoing, in response to the entered password, call manager 108 communicates 500 with multipoint controller 118 and establishes a media transport channel between the appropriate port of multipoint processor 120 and the media transport part 135 of terminal entity C. Consequently, in response to communication 500, shown is that media transport channel 144 is established with multipoint processor 120. Note that in the event that the conference call associated with the password entered by human user C is no longer ongoing, multipoint controller 118 tells human user C, via communication over media transport channel 144 and through terminal C, that the conference call is no longer ongoing.

Those having skill in the art will recognize that significant "cost" (as used herein, the term "cost" can reflect network efficiency costs, monetary costs, reliability costs, or any combination of the foregoing) is associated with establishing and maintaining media transport channels. It has been discovered by the inventors named herein ("inventors"), and such discovery forms part of the inventive content of this patent application, that the foregoing-described related-art practice of establishing a media transport channel merely to be told that a conference call is no longer ongoing generates costs that would be better to avoided. Unfortunately, no practicable way of doing the foregoing exists in the prior art.

It has been discovered by the inventors, and such discovery forms part of the inventive content of this patent application, that it will sometimes be more cost effective to have a multipoint controller initiate a conference call in response to a request from a terminal to join an ongoing conference call. Unfortunately, no practicable way of doing the foregoing exists in the prior art.

It is therefore apparent that a need exists in the art for a method and system that will substantially optimize calling by decreasing the costs associated with conference calls by (1) decreasing the number of media transport channels that must be set up and torn down in order to establish that a conference call exists, and (2) by allowing the direction of call origination—when adding participants to conference calls—to be done in a substantially optimum fashion.

SUMMARY OF THE INVENTION

The inventors have devised a method and system which, among other things, can be utilized to decrease the costs associated with conference calls by (1) decreasing the number of media transport channels that must be set up and torn down in order to establish that a conference call exists, and/or (2) allowing the direction of call origination—when adding participants to conference calls—to be done in a substantially optimum fashion.

In one embodiment, a method for joining a meet-me conference call includes but is not limited to establishing a Call Optimization Application (COA) channel between a Multipoint Controller-Call Optimization Application (MC-COA) and a Call Optimization Application co-resident with the terminal (Terminal-COA) following an address resolution, in response to an application program co-resident with a terminal receiving a request to join an ongoing meet-me conference call; receiving, over the COA channel, a first message from the MC-COA as to whether the meet-me conference call is still ongoing; and in response to the first message indicating that the meet-me conference call is no longer ongoing, giving notification that the meet-me conference call is no longer ongoing. In one embodiment, in response to the first message indicating that the meet-me conference call is still ongoing, the method includes but is not limited to exchanging cost information data between the Terminal-COA and the MC-COA; and in response to user input and the exchanged cost information data, establishing a media transport channel. A related method for adding a participant to a conference call, the method including but not limited to querying a multipoint controller as to whether a meet-me conference call is still ongoing, in response to receiving a first message, over a Call Optimization Channel (COA), from a Call Optimization Application co-resident with a terminal (Terminal-COA), that a user desires to join a meet-me conference call; and sending a message, containing results of said querying, over the COA channel. In various other embodiments, hardware and/or software effect the foregoing referenced methods.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art, by referencing the accompanying drawings.

FIG. 3 illustrates events associated with a user joining a related-art conference call.

DETAILED DESCRIPTION OF THE DRAWINGS

The following sets forth a detailed description of a mode for carrying out embodiments described. The description is intended to be illustrative of the invention and should not be taken to be limiting.

Figure 2:
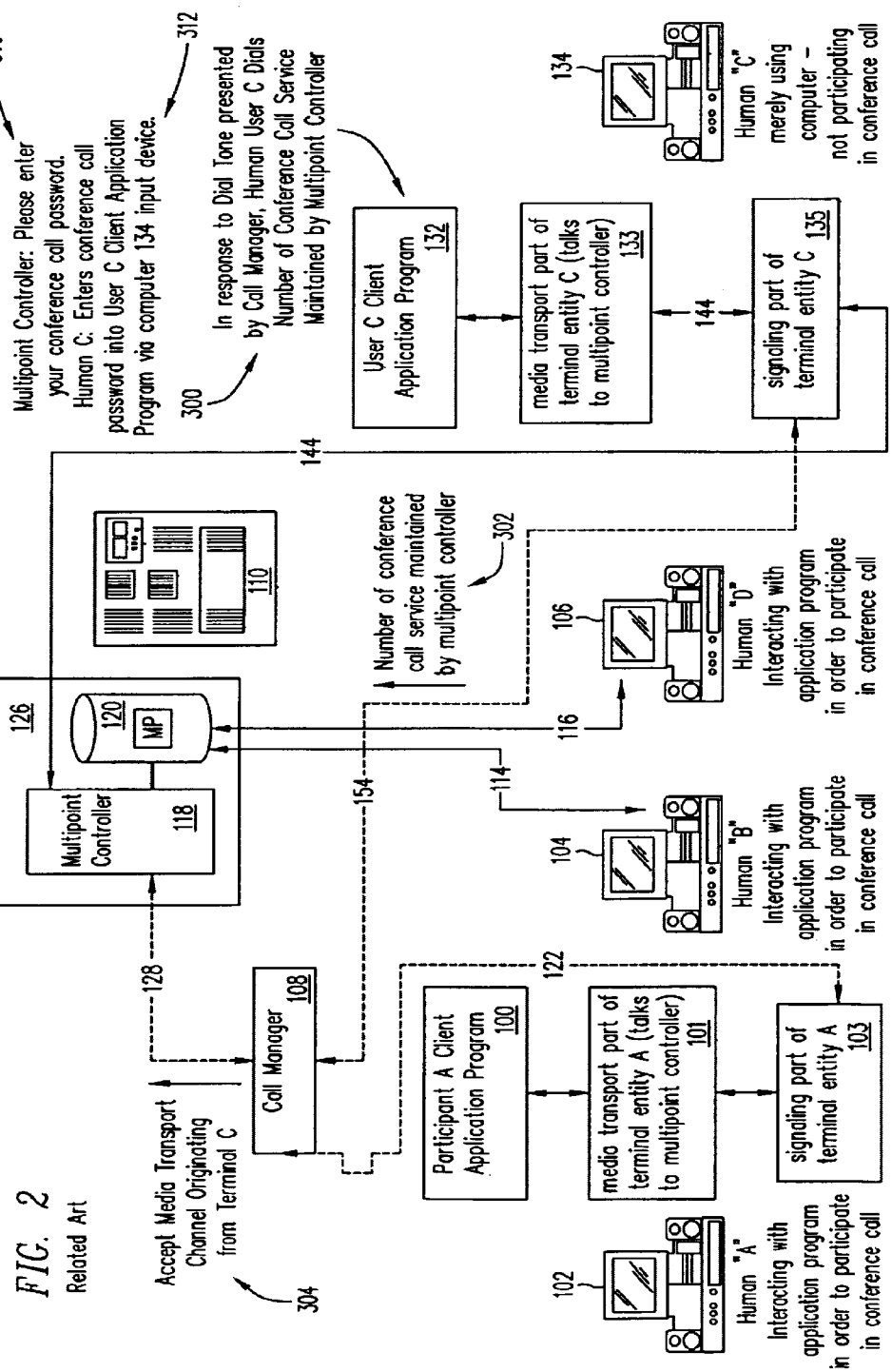
FIG. 2 depicts events associated with a user joining a related-art conference call.
Figure 4B:
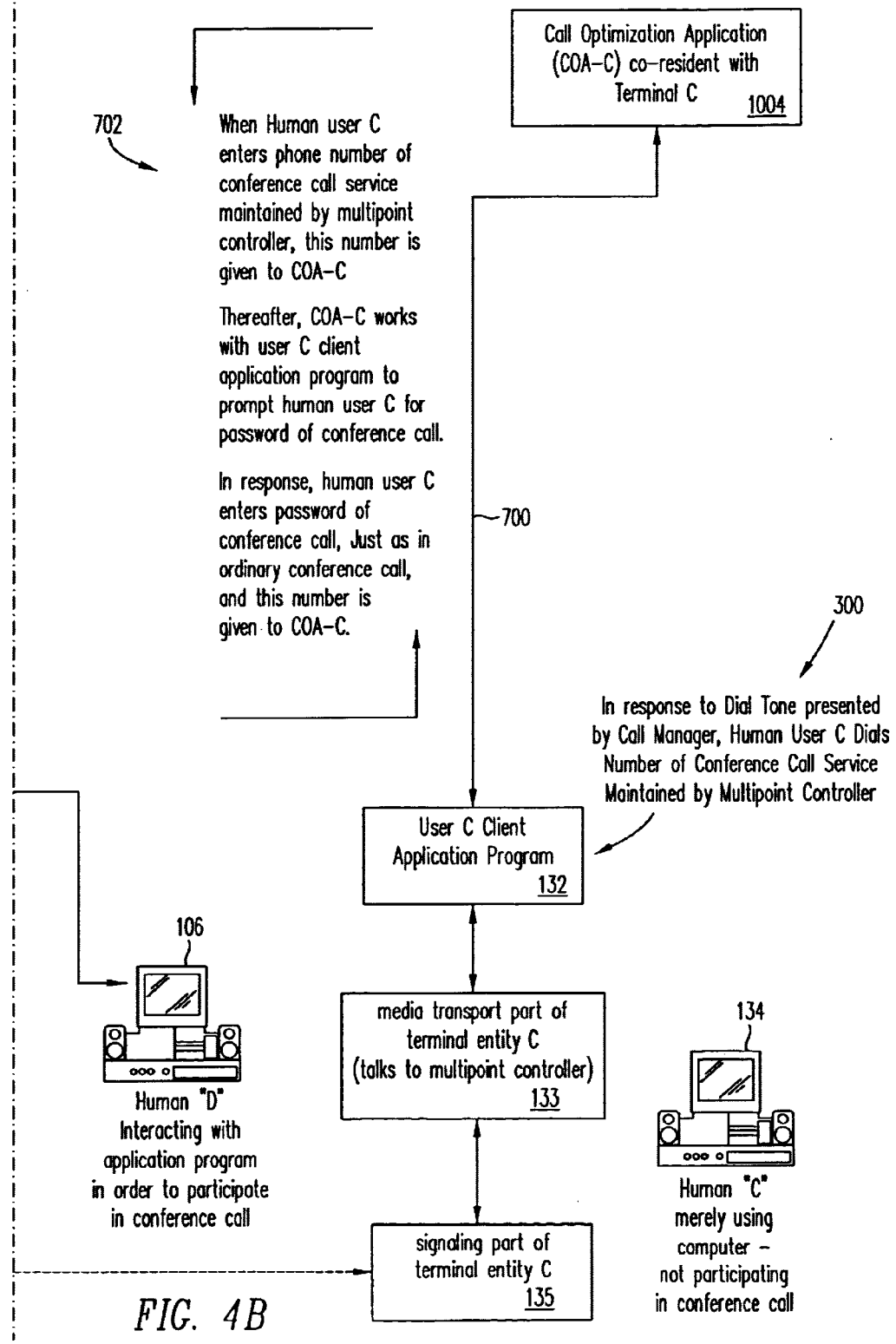
FIG. 4 shows how embodiments described herein begin to differentiate themselves from the related art at or around event 300 as was shown and described in relation to related-art FIG. 2.

Referring now to FIG. 4, illustrated is a network assumed to have had a flow of events substantially similar to the flow of events shown in related-art FIG. 2, up to and including the event 300 of user C dialing the telephone number of the conference call service maintained by multipoint controller 118. However, depicted is that instead of the subsequent flow of events as described in relation to related-art FIG. 2, shown in FIG. 4 is that in response to event 300, once user C client application program 132 has learned via event 300 that terminal entity C is attempting to join a meet-me conference call (in one embodiment, via a maintained list of conference call service telephone numbers), user C client application program 132 logically connects 700 with Call Optimization Application co-resident with Terminal C (COA-C) 1004, depicted as a program resident within network computer 134, and informs COA-C 1004 that user C is attempting to join a meet-me conference call and passes COA-C 1004 the previously-input telephone number of the conferencing service. Thereafter, shown is that COA-C 1004 communicates and works with user C client application program 132, such that human user C is presented with the same "user experience" depicted and described in relation to related-art FIG. 2, in that COA-C 1004 communicates and works with user C client application program 132 such that human user C is prompted (typically via use of a voice synthesizer as described in relation to FIG. 2, above) for the password of the conference call. In short, COA-C 1004 communicates and works with user C client application program 132, such that it appears to human user C that he is in communication with multipoint controller 118 as described in relation to FIG. 2, when in point of fact all activity is taking place local to human user C's computer 134.

Figure 5A:
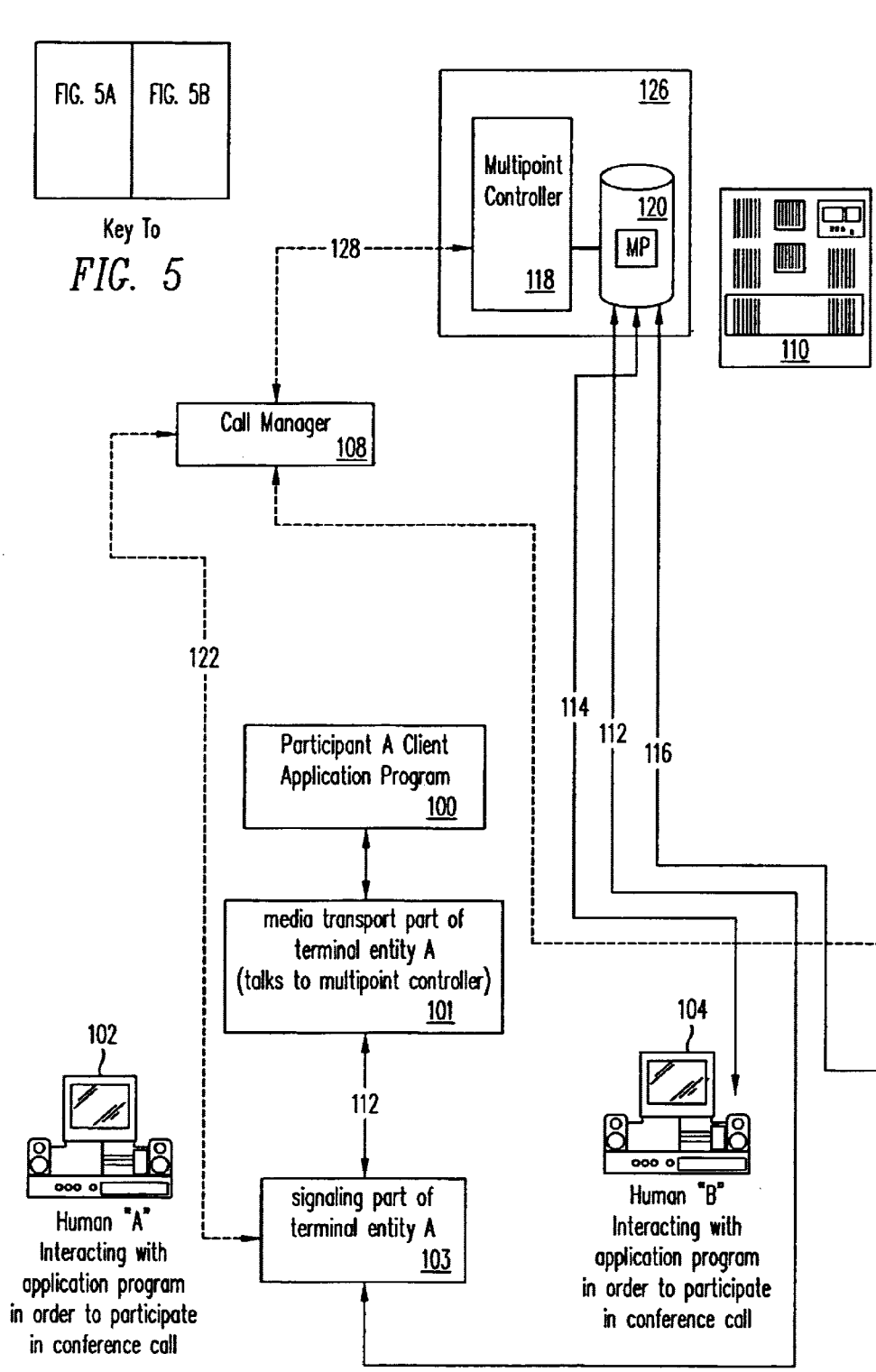
FIG. 5 illustrates that computer 110 (wherein multipoint controller 118 resides) and computer 134 (wherein terminal entity C resides) both have relatively constant access to one or more essentially free network connections whose properties, for one reason or another, render them insufficient to serve as media transport channels.
Figure 5B:
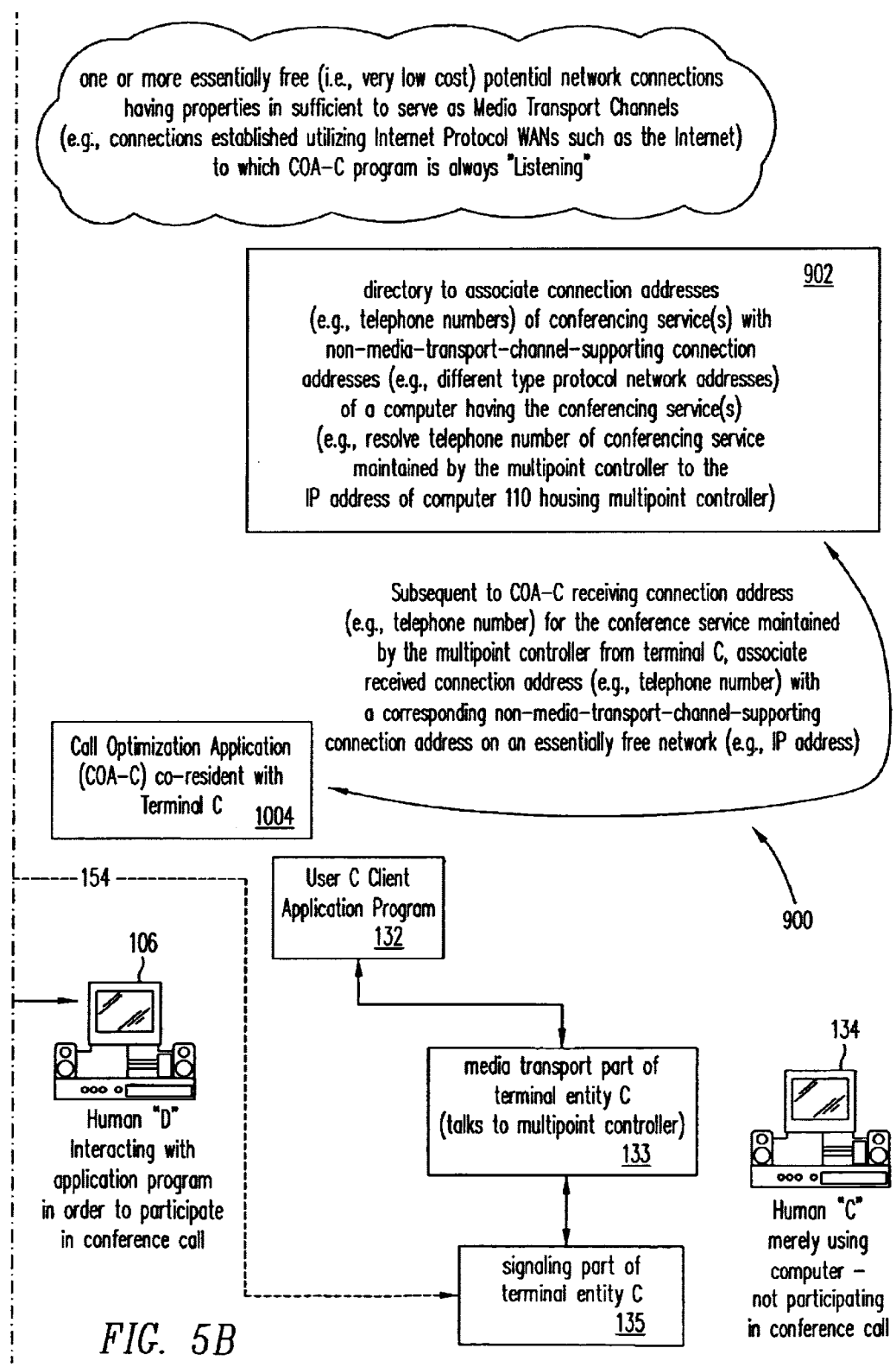

With reference now to FIG. 5, illustrated is that computer 110 (wherein multipoint controller 118 resides) and computer 134 (wherein terminal entity C resides) both have relatively constant access to one or more essentially free (i.e., very low cost, as the term "cost" was defined in the description of the related art section above) network connections whose properties, for one reason or another, render them insufficient to serve as media transport channels. (Such connections are types of "non-media-transport-channel supporting" connections. The term "media-transport-channel-supporting connection," as used herein, means a network connection having capabilities sufficient to support defined media transport channel requirements such as were discussed in the description of the related art section above. The term "non-media-transport-channel-supporting connection," as used herein, means a network connection having capabilities which are NOT sufficient to support defined media transport channel requirements such as were discussed in the description of the related art section above.) For reasons that will become apparent below, COA-C 1004 is going to attempt to establish a channel, via use of one of those essentially free network connections, with its counterpart (e.g., MC-COA 702 which will be introduced in FIG. 6) on computer 110.

Accordingly, once COA-C 1004 decides what type of connection it will use (e.g., COA-C 1004 decides to use an IP network connection), shown is that COA-C 1004 consults 900 directory 902 containing entries to associate connection addresses (e.g., telephone network numbers) with non-media-transport-channel-supporting connection addresses (e.g., different type protocol network addresses) in order to resolve the telephone number of the conference call service maintained by multipoint controller 118 to an IP address of computer 110 housing multipoint controller 118. With the address so determined, COA-C 1004 can establish the desired, or COA, channel.

Figure 6B:
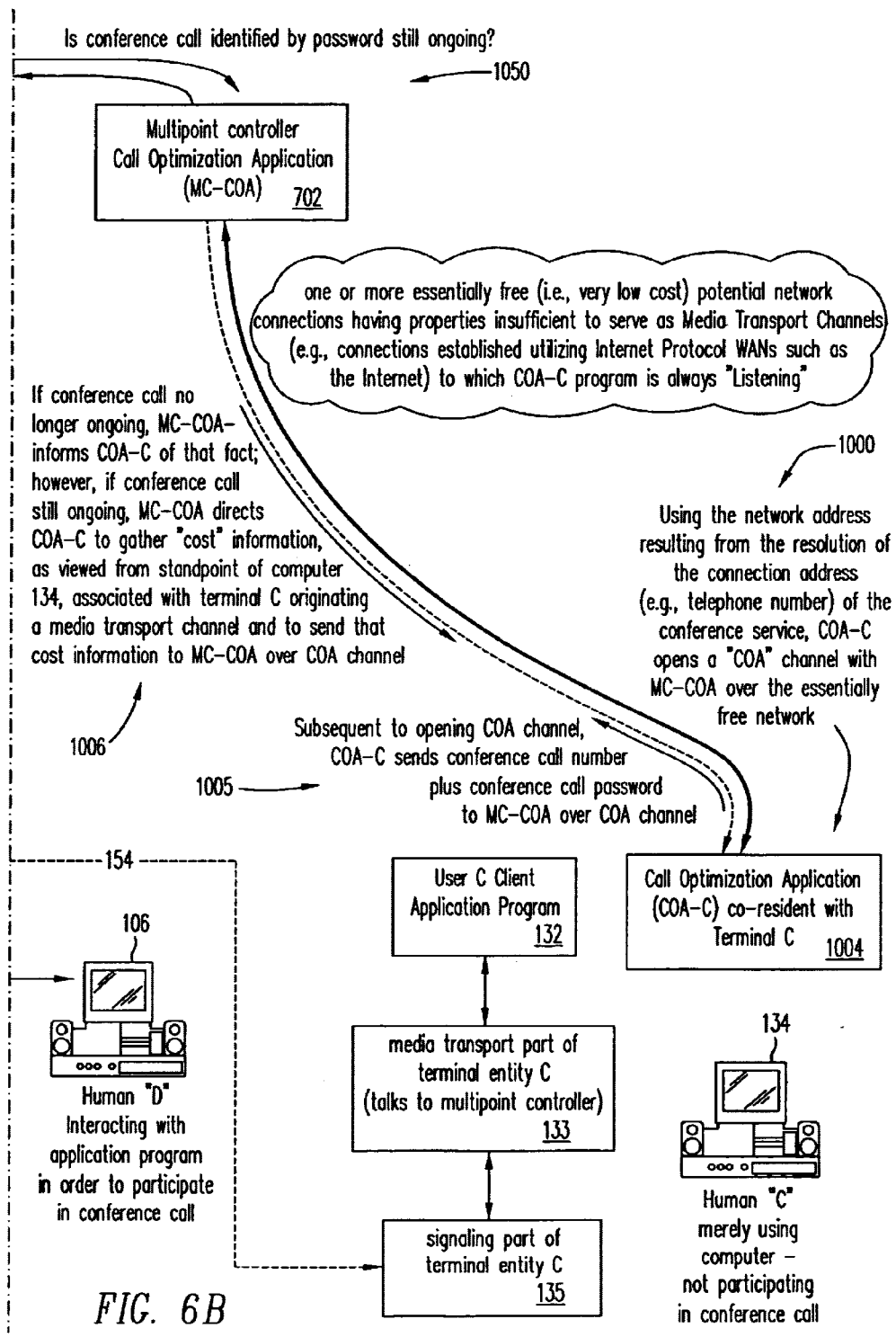
FIG. 6 depicts that COA channel 1002, which is a non-media-transport-channel-supporting connection, has been opened by use of the resolved non-media-transport-channel-supporting connection address described in relation to FIG. 5.

Referring now to FIG. 6, shown is that COA channel 1002, which is a non-media-transport-channel-supporting connection, has been opened by use of the resolved non-media-transport-channel-supporting connection address described in relation to FIG. 5. Depicted is that, subsequent to opening COA channel 1002, COA-C 1004 sends 1005 the conference call telephone number along with its associated conference call password, previously entered by human user C, to MC-COA 702 via COA channel 1002. Upon receipt of the conference call telephone number and its associated conference call password, shown is that MC-COA 702 communicates with multipoint controller 118 and determines whether the conference call identified by the conference call password is still viable. If not, then MC-COA 702 sends message 1006 to COA-C 1004 stating that the desired conference call is no longer viable. Thereafter, COA-C 1004 works with user C application program 134 to inform (e.g., via audio/visual notification) human user C that the conference call user C desires to join is no longer in existence.

If MC-COA 702 determines that the conference call identified by the conference call password is still ongoing, MC-COA 702 sends message 1006 to COA-C 1004 asking COA-C 1004 to determine the costs associated with terminal entity C originating a media transport channel with multipoint controller 118, as viewed from the standpoint of computer 134 (e.g., the network location of terminal entity C), and to send such gathered cost information back to MC-COA 704.

Figure 7B:
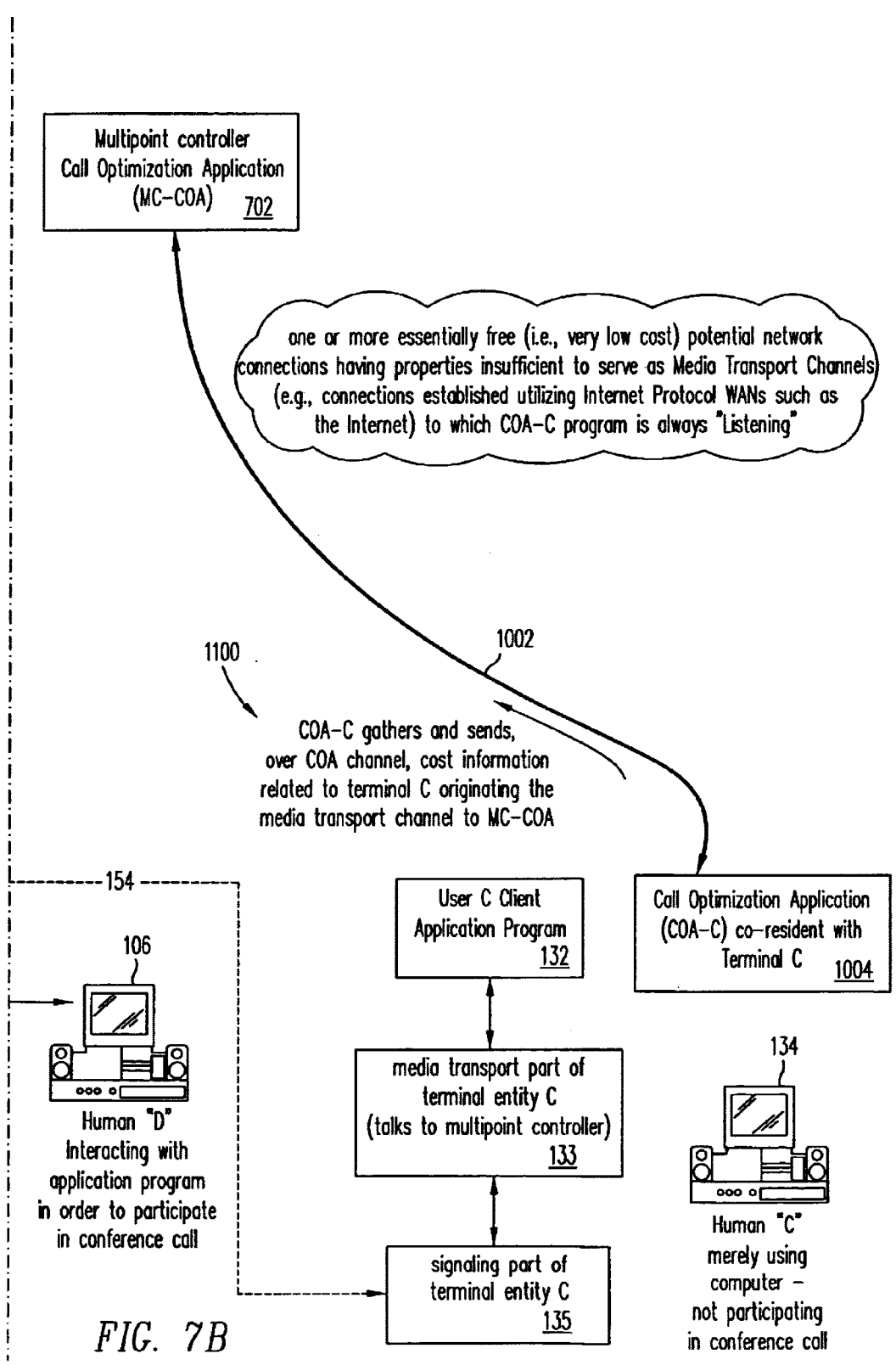
FIG. 7 illustrates that in response to message 1006, COA-C 1004 gathers cost information, as viewed from the standpoint of computer 134 (e.g., how much it would cost if terminal entity C originated a media transport channel with multipoint controller 120), and sends 1100 such gathered cost information to MC-COA 702 over COA channel 1002.

With reference now to FIG. 7, depicted is that in response to message 1006, COA-C 1004 gathers cost information, as viewed from the standpoint of computer 134 (e.g., how much it would cost if terminal entity C originated a media transport channel with multipoint controller 120), and sends 1100 such gathered cost information to MC-COA 702 over COA channel 1002. Once MC-COA 702 has this information, it can make cost optimization assessments.

Figure 8A:
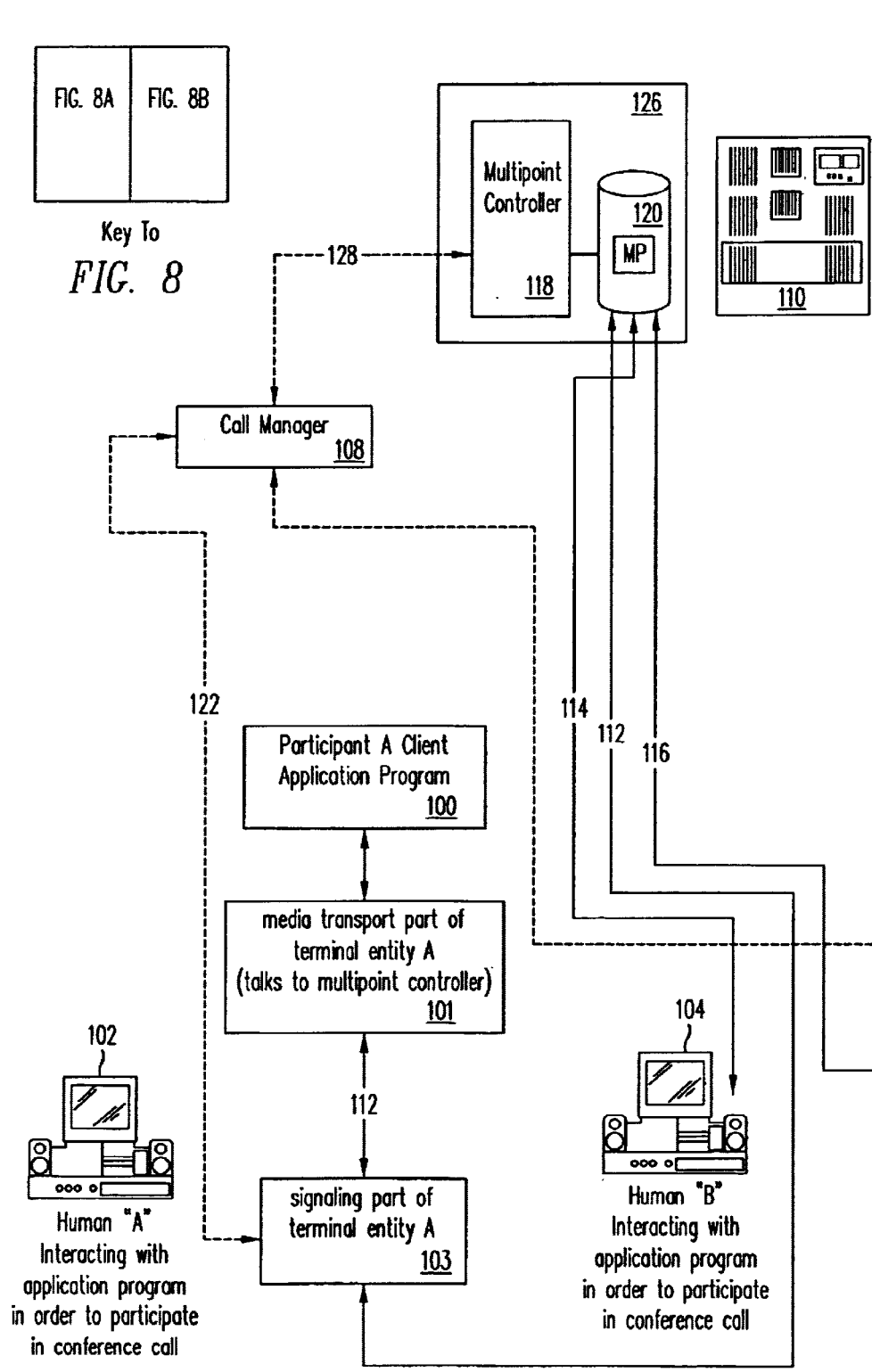
FIG. 8 illustrates event 1200 wherein is depicted that MC-COA 702, upon receipt of "cost" information viewed from the standpoint of computer 134 (i.e., message 1100), compares such received "cost" information against "cost" information, viewed from the standpoint of computer 110 (the network location where multipoint controller 118 is resident), associated with multipoint controller 118 originating a media transport channel with terminal entity C.
Figure 8B:
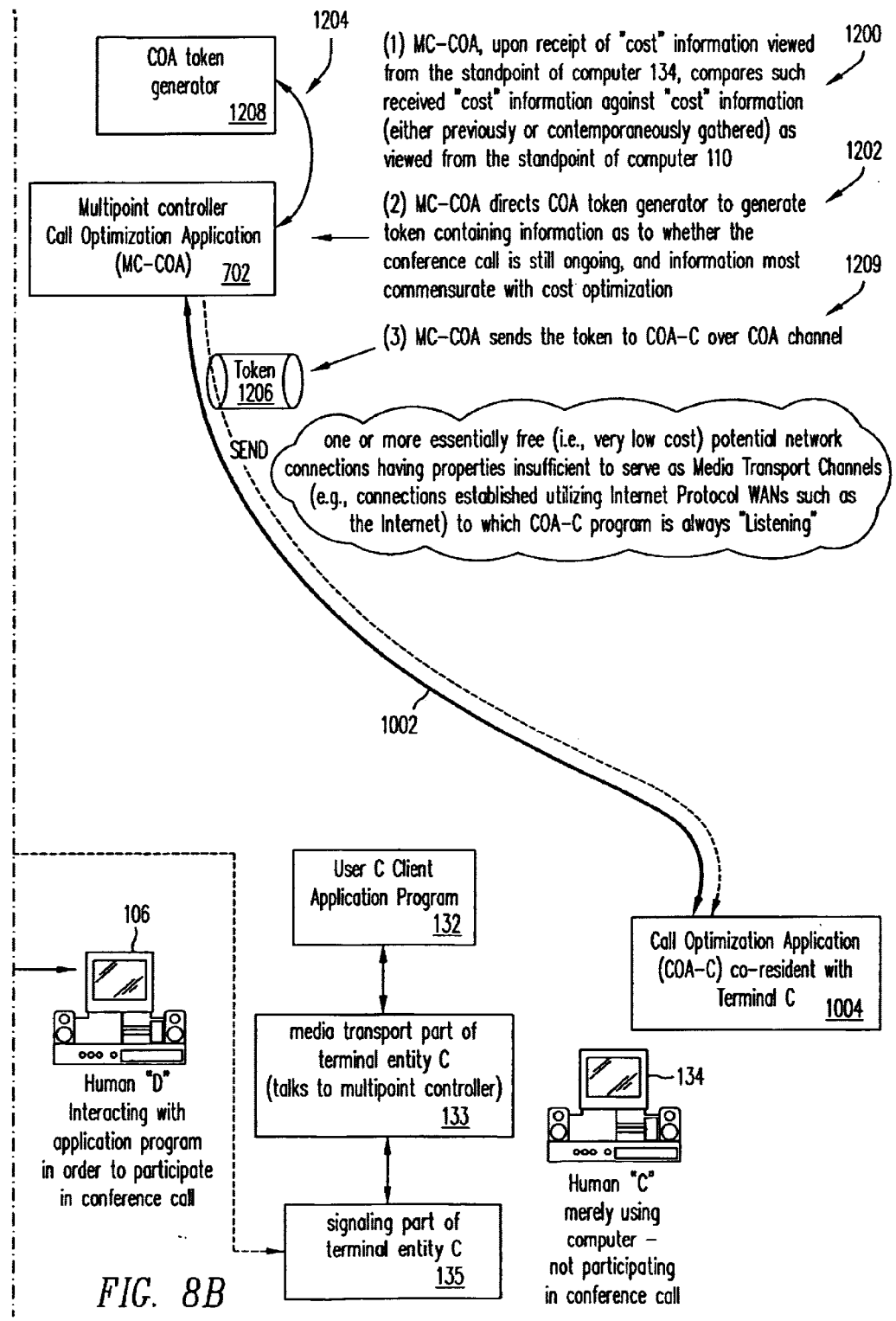

Referring now to FIG. 8, illustrated is event 1200 wherein is depicted that MC-COA 702, upon receipt of "cost" information viewed from the standpoint of computer 134 (i.e., message 1100), compares such received "cost" information against "cost" information (either previously or contemporaneously gathered), as viewed from the standpoint of computer 110 (the network location where multipoint controller 118 is resident), associated with multipoint controller 118 originating a media transport channel with terminal entity C. Thereafter, event 1202 shows that MC-COA 702 directs 1204 COA token generator 1208 to generate token 1206 containing information including but not limited to information that the conference call to which human user C is seeking admission is still ongoing, and the information most commensurate with cost optimization (e.g., whether it would be more cost effective for terminal entity C to originate a media transport channel to multipoint controller 118, as opposed to vice versa). Thereafter, event 1209 depicts that MC-COA 702 sends token 1206 (containing the designated information) to COA-C 1004 over COA channel 1002.

Those skilled in the art will recognize that token 1206 may contain numerous fields containing information related to the invitation and/or call optimization criteria. In one embodiment, the token contains a "token ID" field, a "conference ID" field (identifying the ongoing conference call), a "network addresses of the computer wherein the multipoint controller/MC-COA resides" field (utilized to allow alternate COA channel establishment and communication, since the COA channel can be established over many different types of networks, not all of which might be contained in the address resolution table discussed above), a "request that terminal accept a media transport channel originating from multipoint controller in order to join the ongoing conference call" field (where such request can be made for cost advantage or other reasons, as described below), and a "secure conference password" field (to be used to enter a conference call should extra security be needed over and above that ordinarily required for a conference call).

Figure 9A:
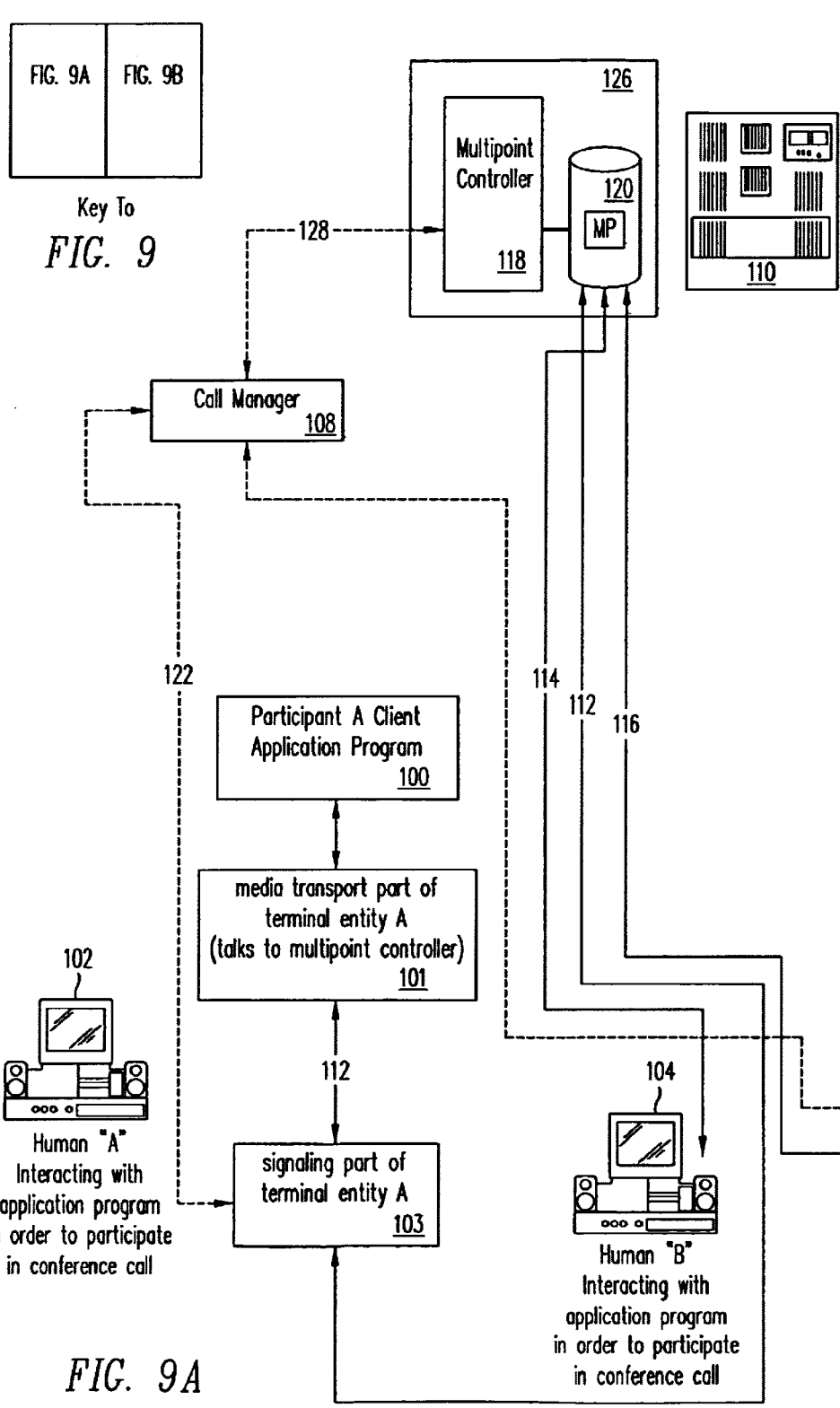
FIG. 9 shows COA-C 1004 displaying conference call options on a graphical user interface (GUI), in response to messaging sent by MC-COA 702.
Figure 9B:
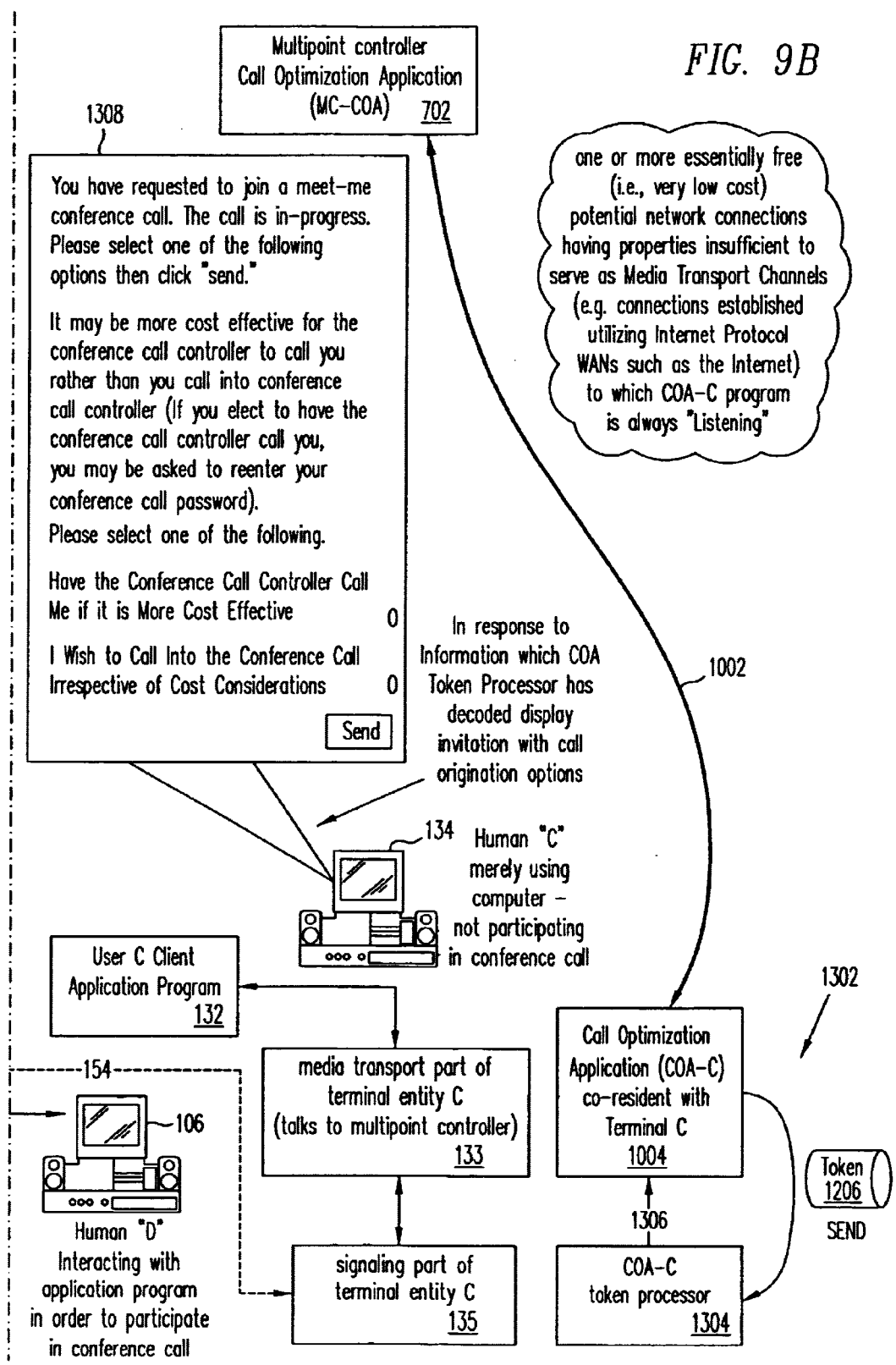

With reference now to FIG. 9, shown is that COA-C 1004 upon receipt of token 1206, passes 1302 token 1206 to COA-C token processor 1304. COA-C token processor 1304 decodes the information in token 1206 and informs, via message 1306, COA-C 1004 of that information. Shown is that, in response to message 1306, COA-C 1004 presents graphical user interface (GUI) 1308 on a visual display device of network station 134. Depicted is that in one embodiment of GUI 1308, user C is informed that that the meet-me conference call is in progress. Further depicted is that user C is informed that it may be more cost effective for the conference call controller (e.g., multipoint controller 118) to originate the media transport channel to terminal C rather than user C initiating the media transport channel into the conference call controller. Shown is that a first option prompts user C for input as to whether user C wants to take advantage of this cost optimization feature. Depicted is that a second option prompts user C as to whether user C desires to originate the media transport channel into the conference call irrespective of cost considerations (i.e., whether user C desires to enter the conference call immediately without exploring cost optimization options).

Figure 10A:
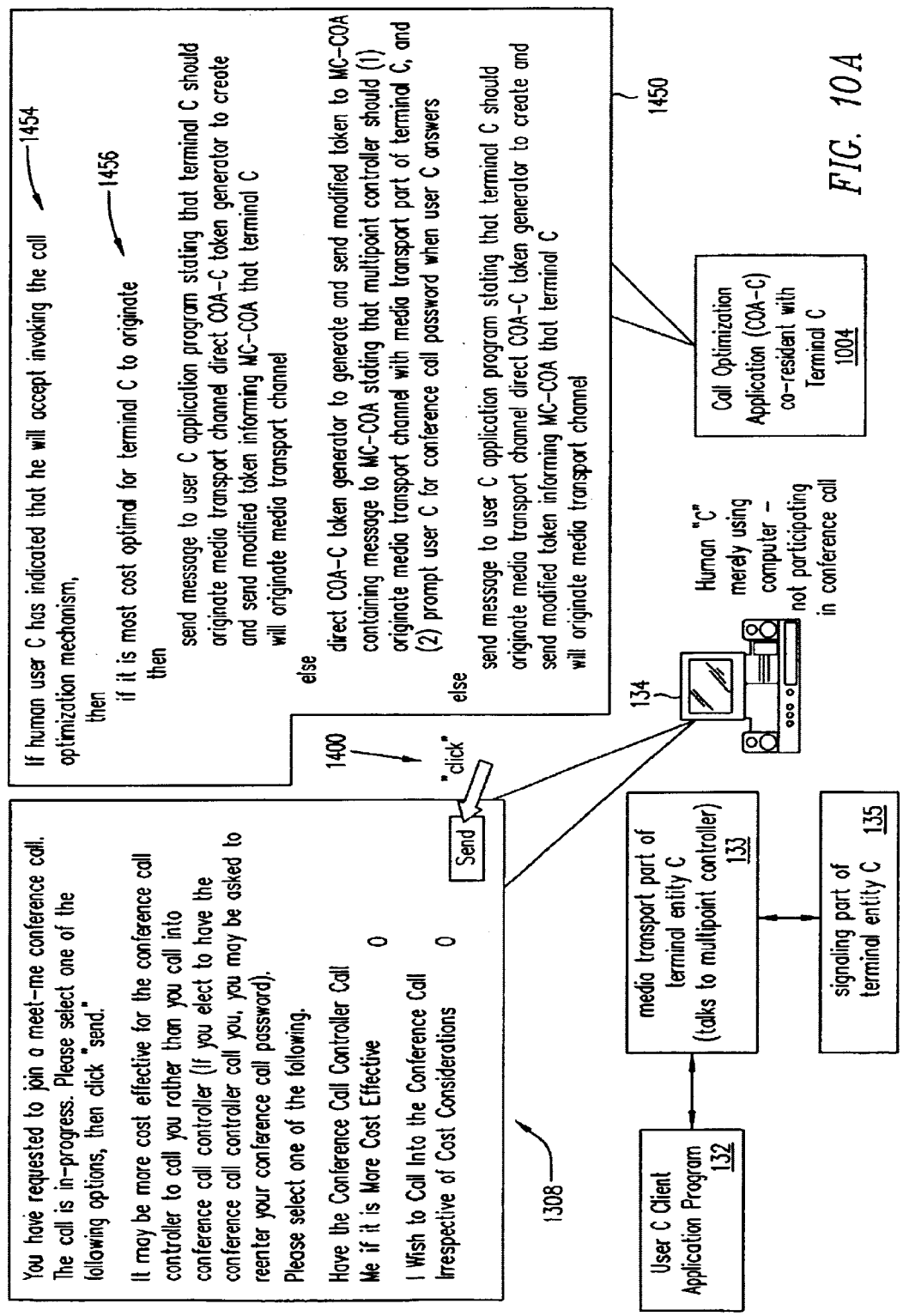
FIG. 10A depicts a process engaged in by COA-C 1004 in response to event 1400 of human user C "clicking" on the send button of GUI 1308.

Referring now to FIG. 10A, shown is event 1400 of human user C "clicking" on the send button of GUI 1308 with the first option (i.e., accepting cost optimization) selected. (For sake of clarity, computer 134 and its associated displays and processes are shown in isolation, but it is to be understood that computer 134 is still resident within the network context depicted and described in FIG. 9 and previous figures). Note that any choice among the first and second options could be selected, but for sake of illustration, shown in FIG. 10A is that in response to the options presented in GUI 1308 as were described in relation to FIG. 9, human user C has indicated that he will accept the conference call controller calling him, if such is more cost effective. Shown is that in response to event 1400, process 1450 (illustrated via pseudo-code, which is exemplary of a process in roughly the same way that a high-level logic flowchart is exemplary) occurs.

Depicted is pseudo if-statement 1454 wherein COA-C determines whether human user C has indicated that user C will accept invoking the call optimization mechanism, which may result in a media transport channel originating from multipoint controller 118, if pseudo if-statement 1454 yields a determination that is most cost optimal option. If human user C has indicated that he would like to utilize the cost optimization function which might result in a media transport channel originating from multipoint controller 118, shown is that the process proceeds to pseudo if-statement 1456 wherein is shown that COA-C 1004 determines if the information decoded from token 1206 (e.g., as was described and discussed in relation to FIG. 9) contained an indication that it is most cost optimal for terminal C to originate the media transport channel. If the inquiry of pseudo if-statement 1456 yields a determination that the information decoded from token 1206 contained an indication that it is most cost optimal for terminal C to originate the media transport channel, then depicted is that COA-C 1004 sends a message to user C application program 132 stating that terminal C should originate media transport channel into the conference call; thereafter, user C application program 132 causes media transport part 133 of terminal C to originate the media transport channel with multipoint controller 118. Subsequently, further depicted is that COA-C 1004 directs COA-C token generator 1406 to create and send (illustrated in FIG. 10B, following) a modified token informing MC-COA that terminal C will originate the media transport channel.

In the event that, as a result of the inquiry of pseudo if-statement 1456, COA-C 1004 determines that the information decoded from token 1206 (e.g., as was described and discussed in relation to FIG. 9) contained an indication that it is most cost optimal for the multipoint controller to originate the media channel, shown is that COA-C 1004 directs COA-C token generator to generate and send a modified token to MC-COA 702 containing a message to MC-COA 702 stating that multipoint controller 118 should (1) originate a media transport channel with the media transport part of terminal C, and (2) prompt, via use of the established media transport channel, user C for the conference call password when user C answers (alternatively, in other embodiments, such answering could be done via applications programs utilizing the previously entered conference call password).

In the event that pseudo if-statement 1454 yields a determination that the input of human user C indicated that human user C desires to originate the media transport channel irrespective of cost considerations, shown is that COA-C 1004 sends a message to user C application program 132 stating that terminal C should originate the media transport channel into the conference call; thereafter, further shown is that COA-C 1004 directs COA-C token generator 1206 to create and send (illustrated in FIG. 10B, following) modified token informing MC-COA that terminal C will originate media transport channel.

Figures 1, 10B:
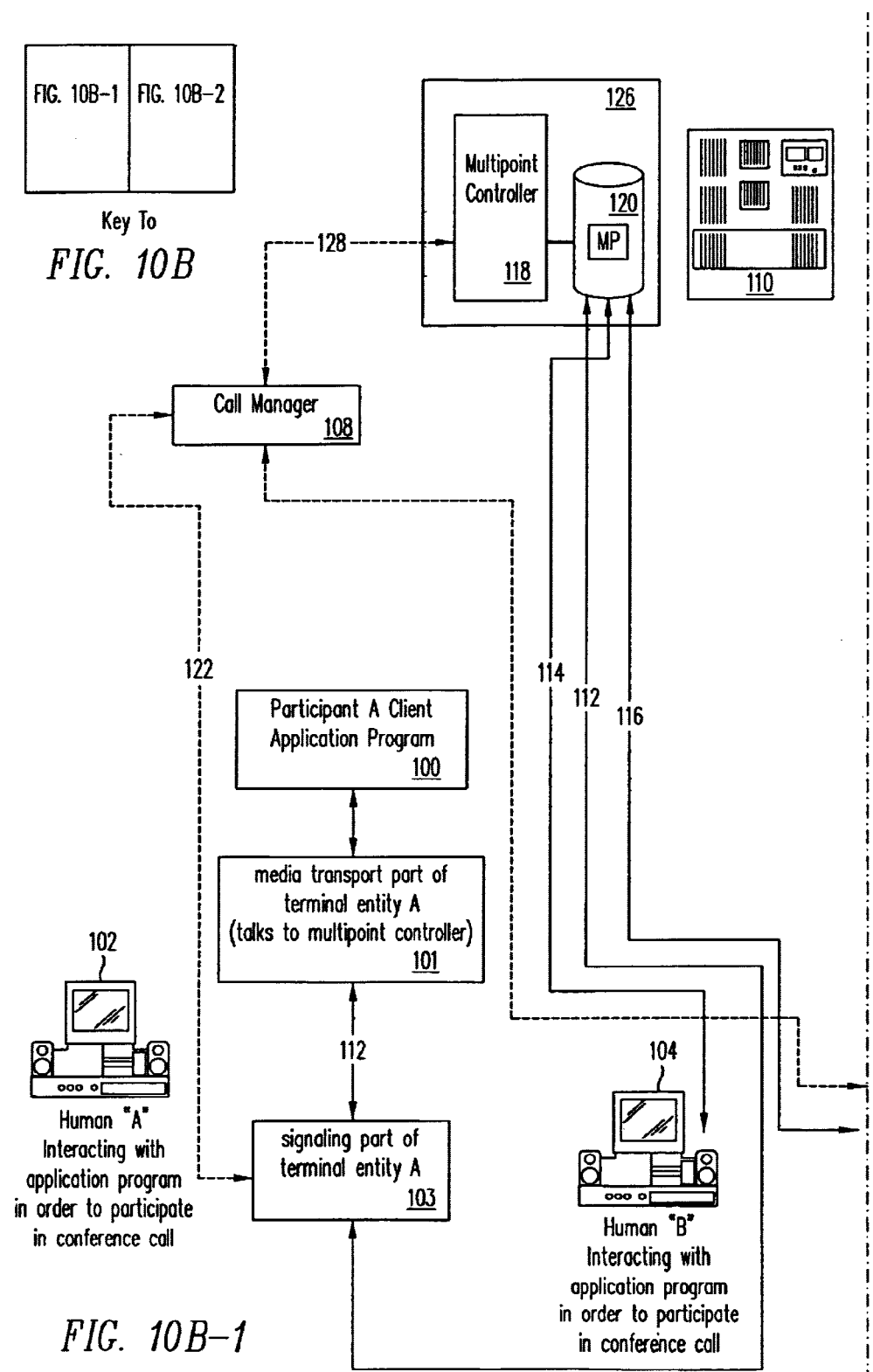
FIG. 1 shows a data communications network in a related-art conference call configuration.
FIG. 10B illustrates messaging sent in response to event 1400 of human user C "clicking" on the send button of GUI 1308.

Referring now to FIG. 10B, shown is event 1400 of human user C "clicking" on the send button of GUI 1308 with the option described in relation to FIG. 10A shown selected. Event 1400 (i.e., "clicking" the send button with the first option selected) initiates event 1402, which depicts that in response to the input from human user C via GUI 1308 (in other embodiments, user input is effected via voice recognition and/or telephony user interface devices), COA-C 1004 sends message 1404 to COA-C token generator 1406 to modify token 1206 to indicate the conference call option selected by human user C's input. Thereafter, COA-C token generator 1406 passes modified-token 1408 to COA-C 1004 which thereafter sends 1410 modified-token 1408 (having fields modified to show the conference call options selected by human user C) back to MC-COA 702.

Figure 11B:
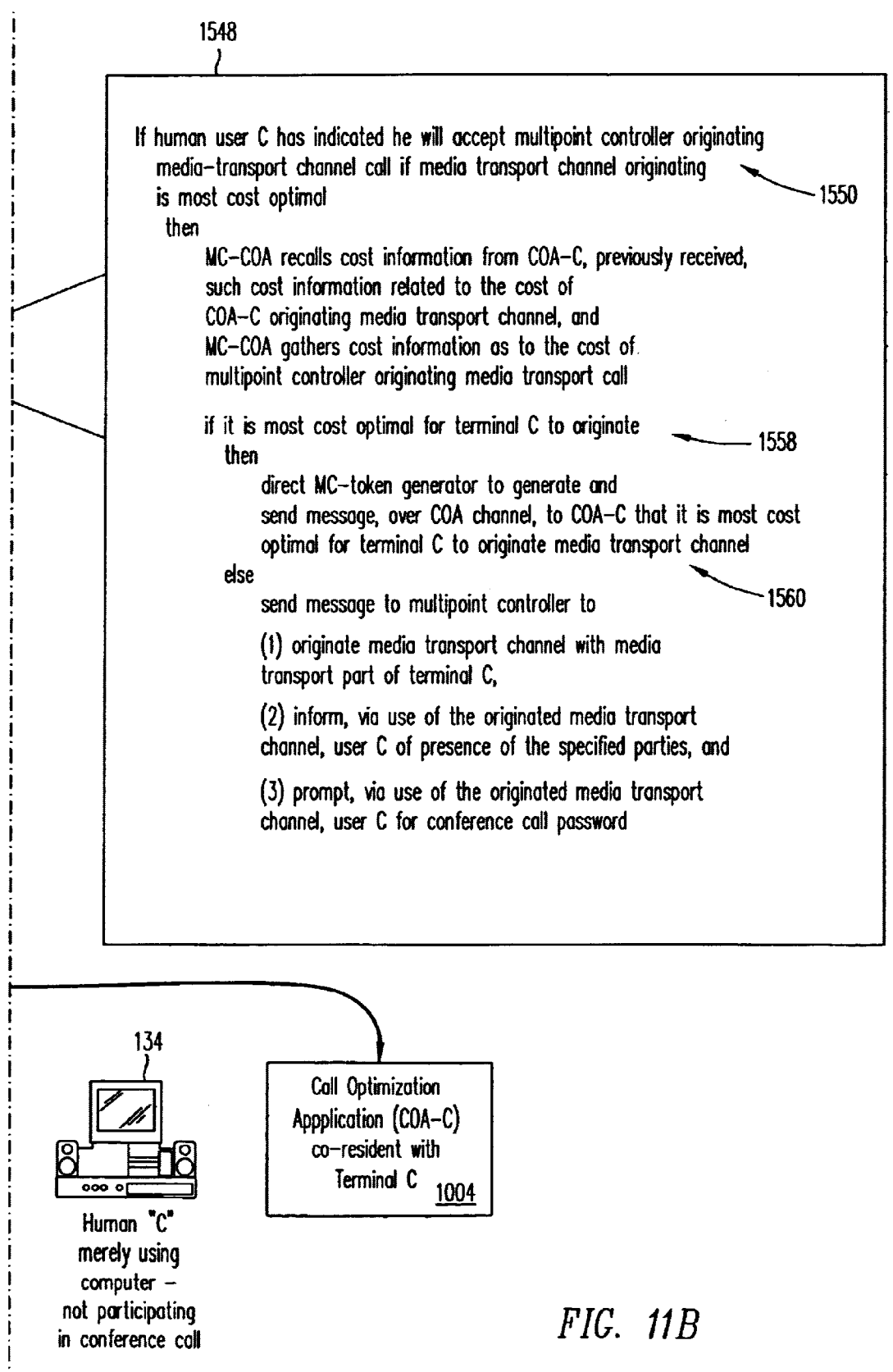
FIG. 11 shows MC-COA 702, upon receipt of messaging, sent by COA-C 1004, containing user response to conference call options.

With reference now to FIG. 11, shown is that MC-COA 702, upon receipt of modified-token 1408, passes 1502 modified-token 1408 to MC-COA token processor 1504. MC-COA token processor 1504 decodes the information in modified-token 1408 and informs, via message 1506, MC-COA 702 of that information (e.g., user C's response to the presented conference call options as was illustrated in FIGS. 10A and 10B). Shown is that, in response to message 1506, MC-COA 702 now knows information as to human user C's response to any conference call options which were presented via GUI 1308 described in relation to FIG. 9. Shown is that, in response to human user C's option choices, process 1548 occurs (shown via the use of pseudo-code, which is exemplary and serves essentially the same demonstrative function herein as a high-level logic flowchart) wherein the following actions and operations take place. Depicted is pseudo if-statement 1550 which shows an inquiry as to whether the token indicates that human user C will accept a media transport channel originating from the conference call controller if such is the most cost optimal strategy. Shown is that in the event that the inquiry of pseudo if-statement 1550 illustrates that human user C has indicated that user C will accept a media transport channel originating from the conference call controller if such is the most cost optimal strategy, then shown is that MC-COA 702 recalls the cost information from COA-C 1004 as to the cost of terminal C originating a media transport channel to multipoint controller 118 which was previously sent via message 1100 described in FIG. 7. In addition, depicted is that substantially simultaneously, MC-COA 702 gathers cost information as to the cost of multipoint controller 118 originating media transport call with media transport part 133 of terminal C.

Thereafter, statement 1560 shows that if it is determined by MC-COA 702 that it is most cost optimal for terminal C to originate the media transport channel, then MC-COA 702 directs MC-token generator 1504 to generate and send a token, over COA channel 1002, containing a message to COA-C 1004 that it is most cost optimal for terminal C to originate the media transport channel.

Otherwise, if as a result of the inquiry of pseudo if-statement 1558, MC-COA 702 determines that it is not cost optimal for terminal C to originate the media transport call, MC-COA 702 sends a message to multipoint controller 118 directing multipoint controller to (1) originate media transport channel with media transport part 133 of terminal C, (2) over the established media transport channel (or perhaps over COA channel 1002 in another embodiment), inform user C of presence of the specified parties, and (3) prompt user C for the conference call password. Assuming that user C answers and inputs the conference call password, the multipoint controller will thereafter ensure that call manager 108 connects media transport part 133 of terminal C into the correct port of multipoint processor 120.

Figures 1, 12A:
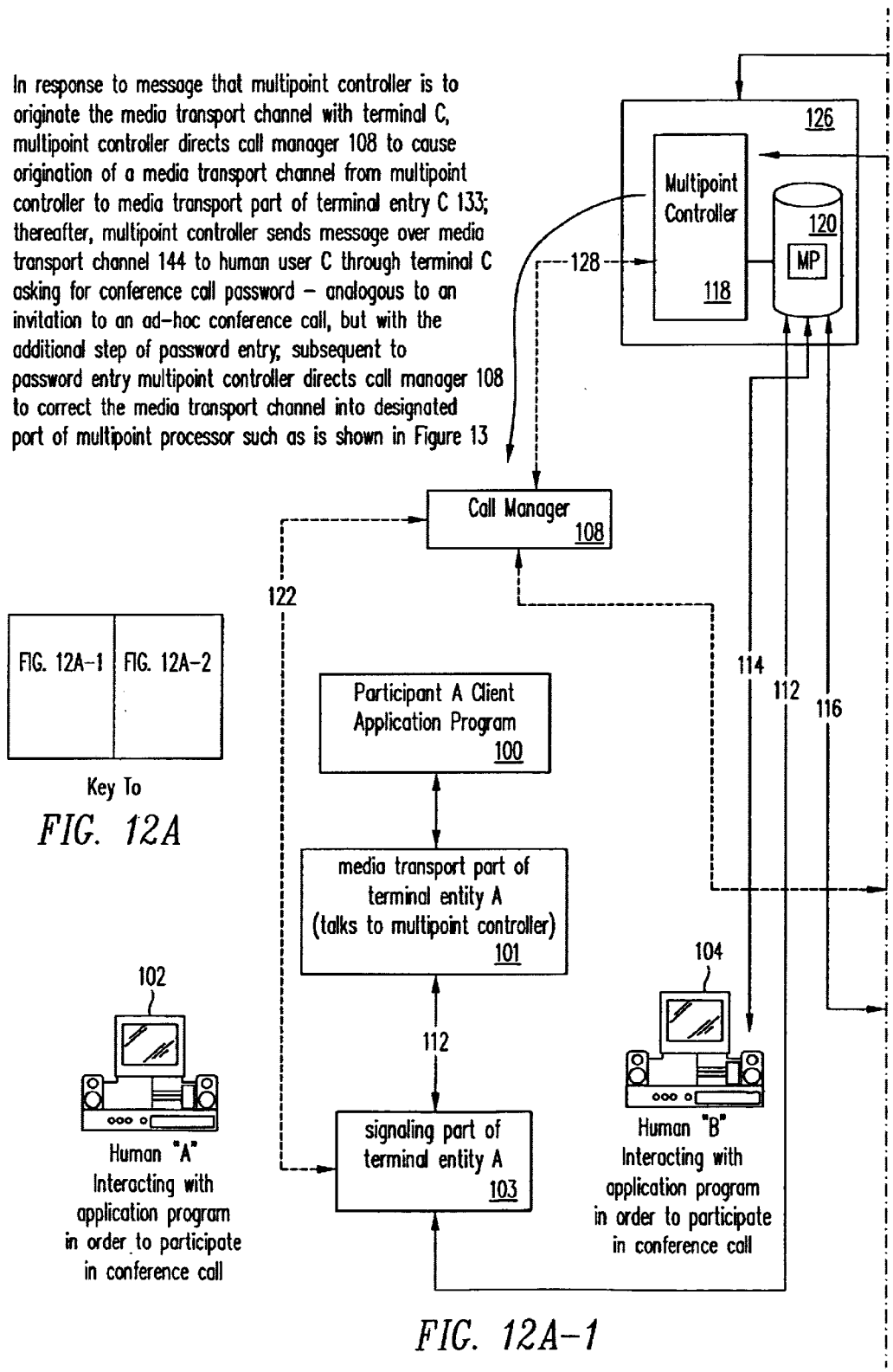
FIG. 12A illustrates that, if as a result of engaging in process 1550, MC-COA 702 determines that conditions indicate that multipoint controller should originate the media transport channel, MC-COA 702 sends a message directing multipoint controller 118 to (a) originate a media transport channel with media transport part 133 of terminal C, and (b) prompt user C for conference call password over the media transport channel, once the media transport channel has been established.
Figures 2, 12A:
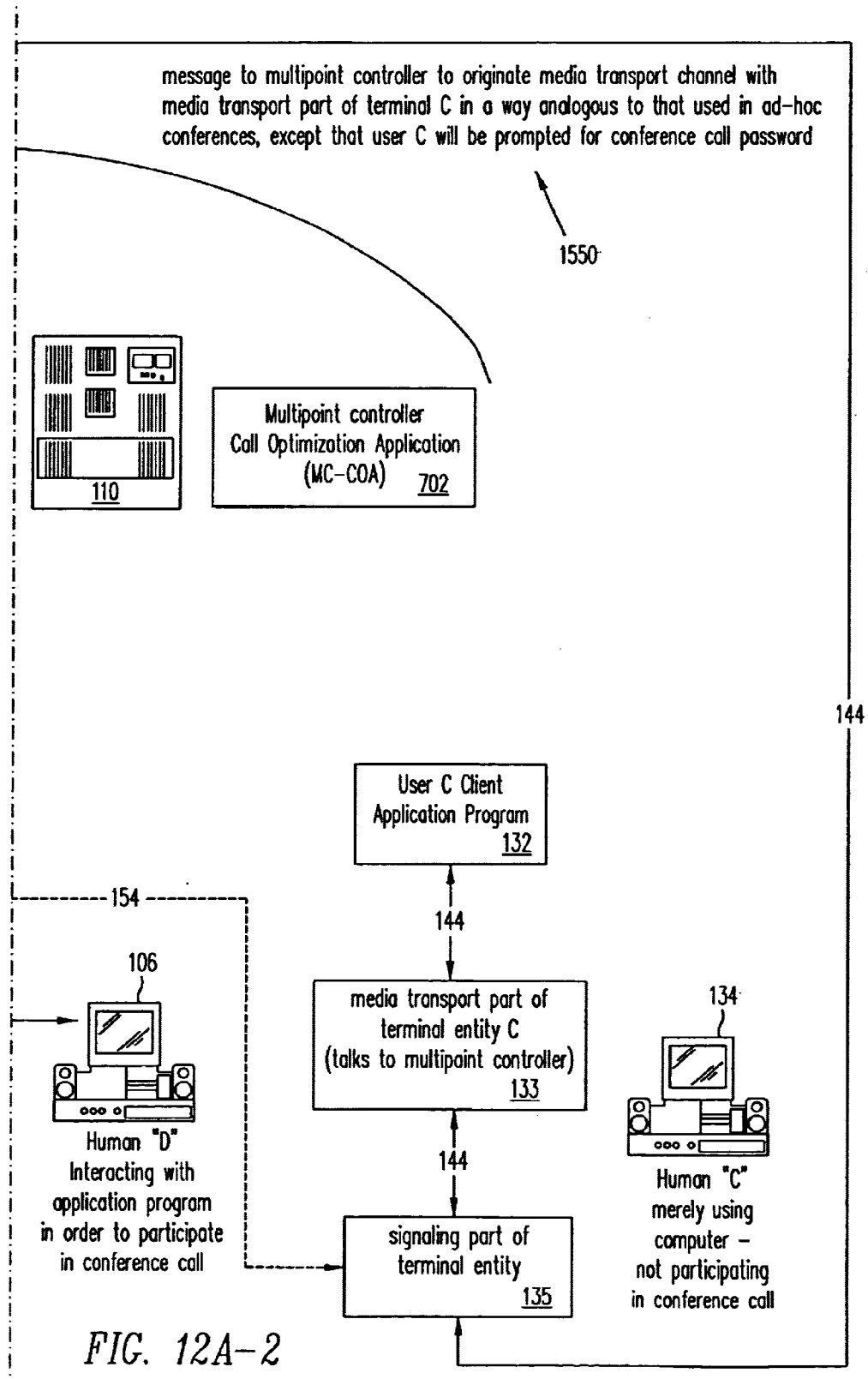

Referring now to FIG. 12A, shown is that if as a result of engaging in process 1548, MC-COA 702 determines that conditions indicate that multipoint controller should originate the media transport channel, MC-COA 702 sends a message directing multipoint controller 118 to (a) originate a media transport channel with media transport part 133 of terminal C, and (b) prompt user C for conference call password over the media transport channel, once the media transport channel has been established.

Figures 1, 12B:
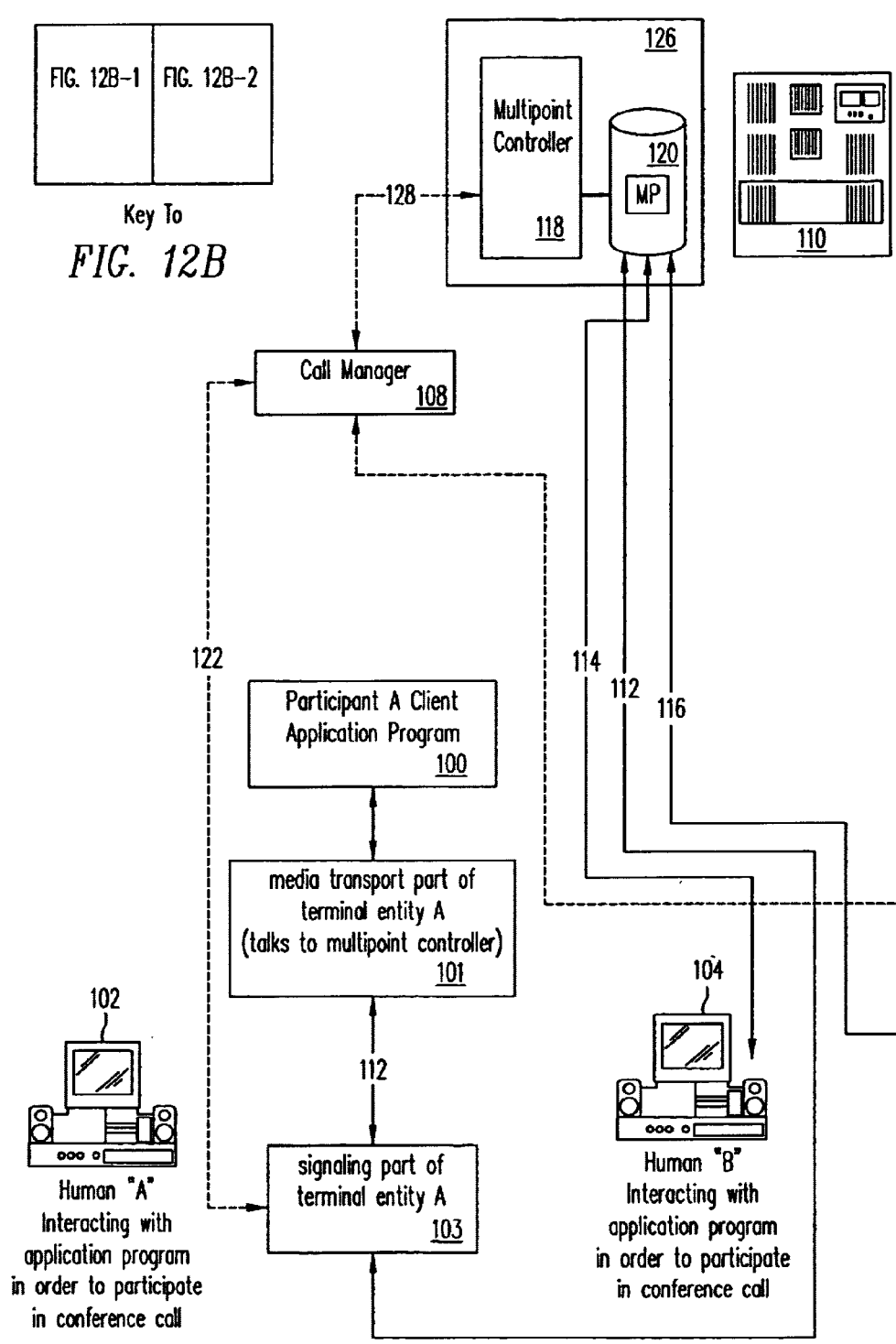
FIG. 12B shows that, if as a result of engaging in process 1550, MC-COA 702 determines that the desired people specified by user C are either present or waiting to be conferenced in to the conference call and that conditions indicate that terminal C should originate the media transport channel, event 1650 transpires wherein MC-COA 702 directs 1654 MC-COA generator 1208 to generate token 1606 containing information that the conference call is ongoing, the desired participants are present, and that media transport part 133 of terminal is to now join the conference call by originating the media transport channel into the conference.
Figures 2, 12B:
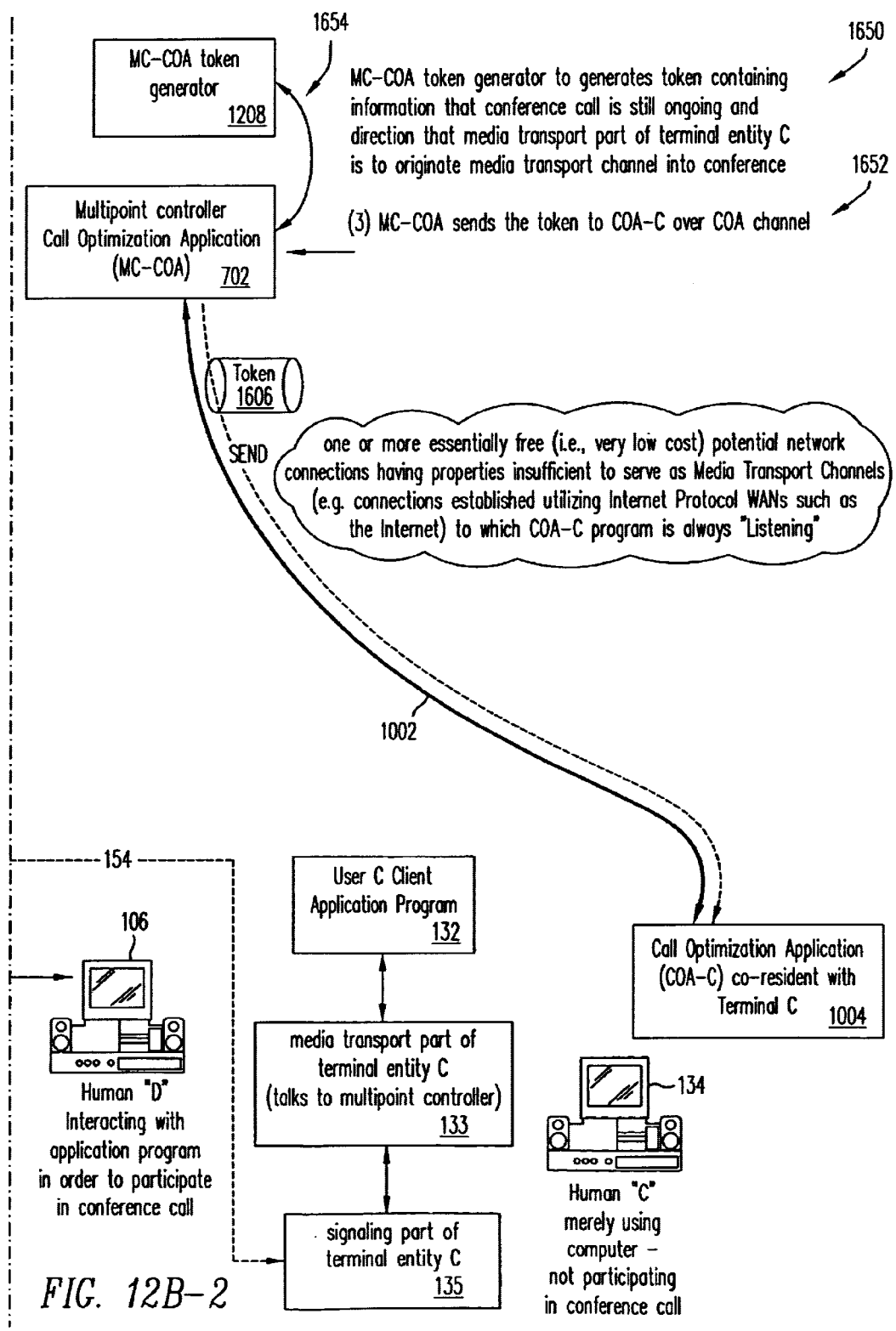

Referring now to FIG. 12B, shown is if as a result of engaging in process 1550, MC-COA 702 determines that conditions indicate that terminal C should originate the media transport channel, shown is event 1650 wherein MC-COA 702 directs 1654 MC-COA generator 1208 to generate token 1606 containing information that the conference call is ongoing, and that media transport part 133 of terminal is to now join the conference call by originating the media transport channel into the conference. Thereafter, depicted is event 1652 wherein MC-COA 702 sends token 1606 to COA-C 1004 over COA channel 1002. Upon receipt of token 1606, COA-C 1004, in conjunction with COA-C token processor 1304 (not explicitly shown in FIG. 12A, but deemed to be present), decodes the information contained in token 1606 and communicates with user C application program 132, which thereafter causes media transport part 133 to originate a media transport channel with multipoint controller 118, which thereafter works with call manager 108 in order to ensure that media transport part 133 is connected with the appropriate port of multipoint processor 120 so that user C becomes a participant in the ongoing conference call.

Figure 13:
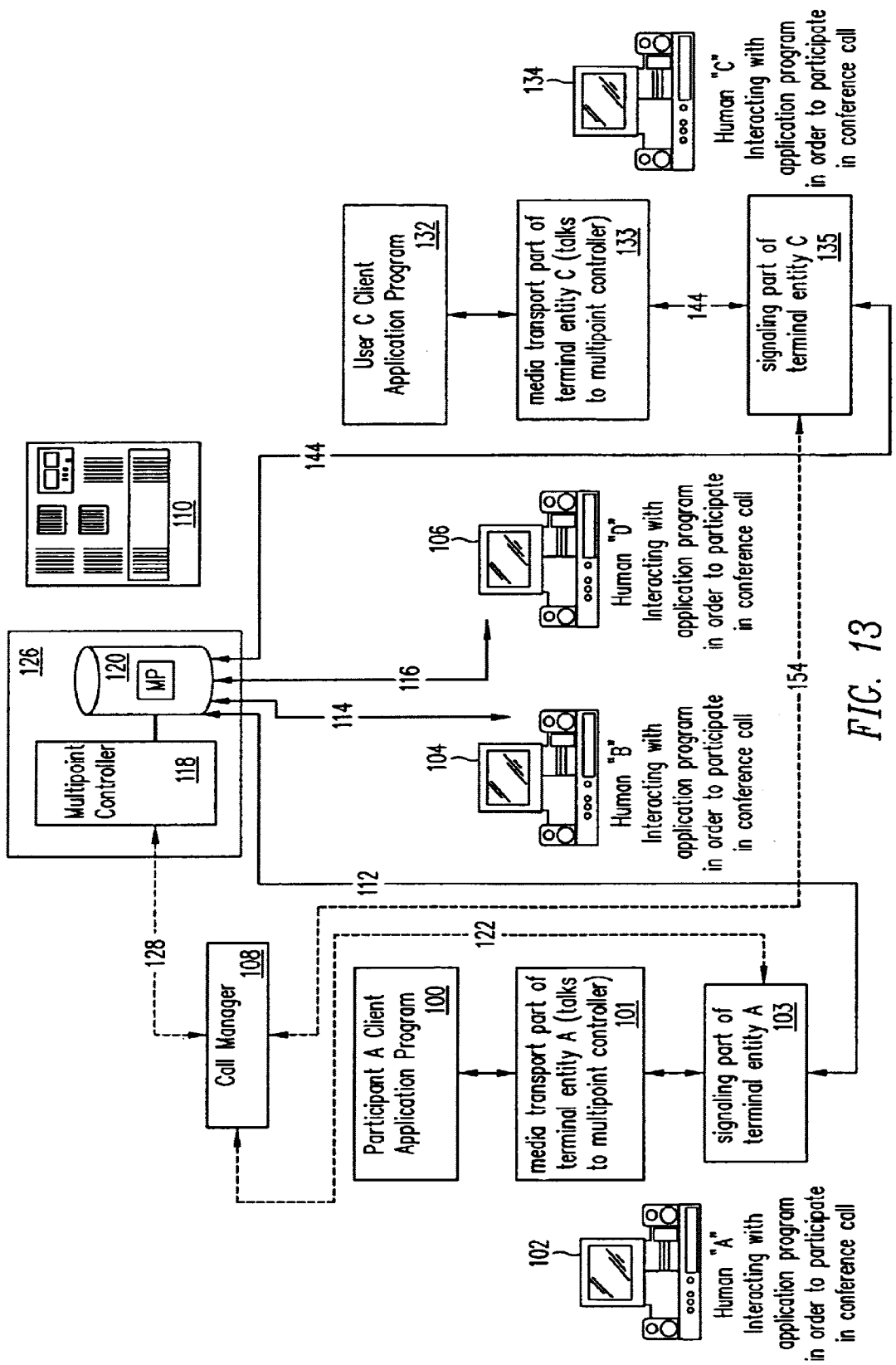
FIG. 13 depicts that media transport channel 144 has been established in a substantially cost-optimized fashion (e.g., in accord with one or more of the actions described in relation to FIGS. 12A and 12B) between multipoint processor 120 (the port of which has been specified by multipoint controller) and media transport part 133 of terminal entity C.
Figures 1, 14A:
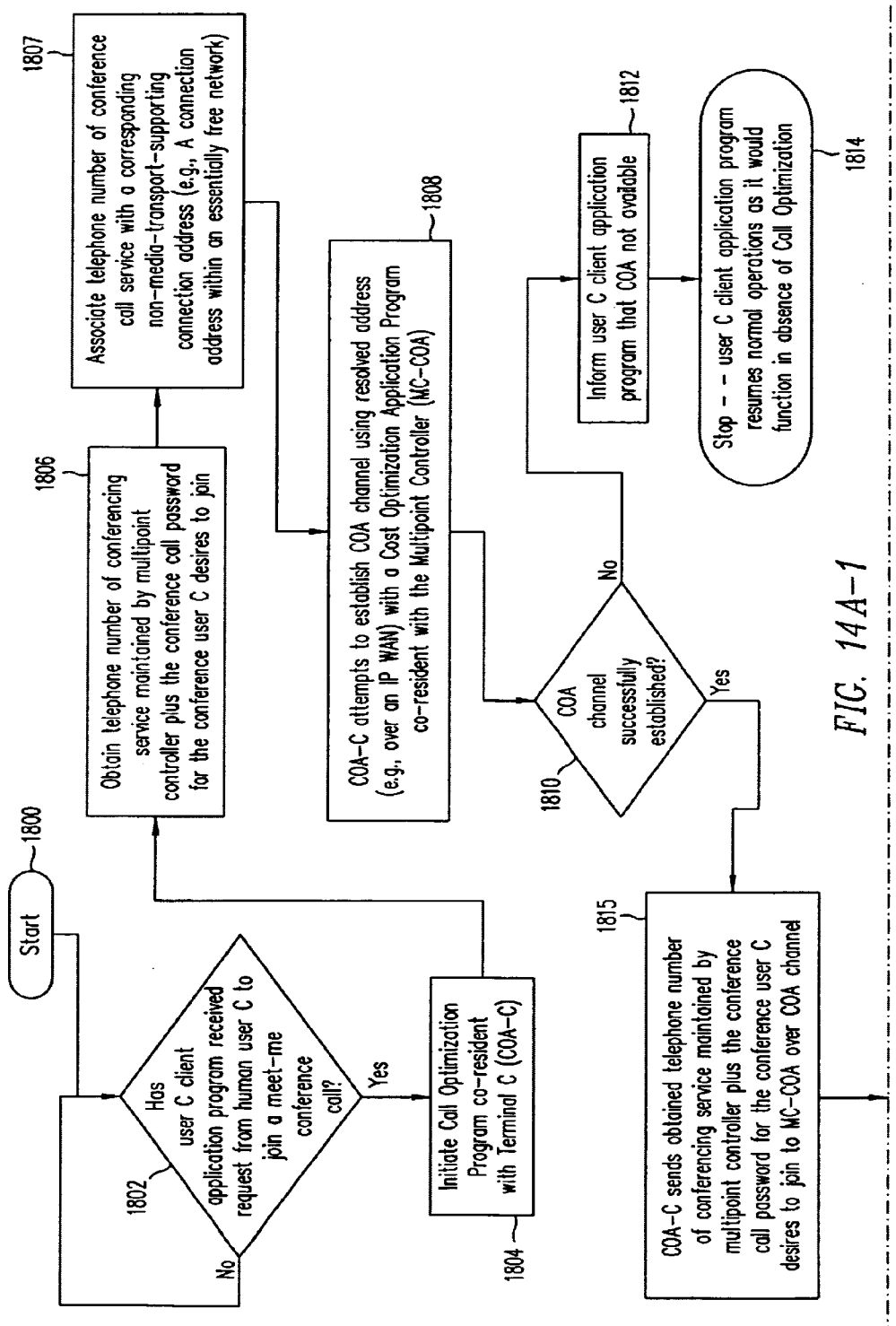
FIGS. 14A and 14B depict a high-level logic flowchart illustrating in more detail a process by which more cost-efficient conference calls can be achieved.
Figures 2, 14A:
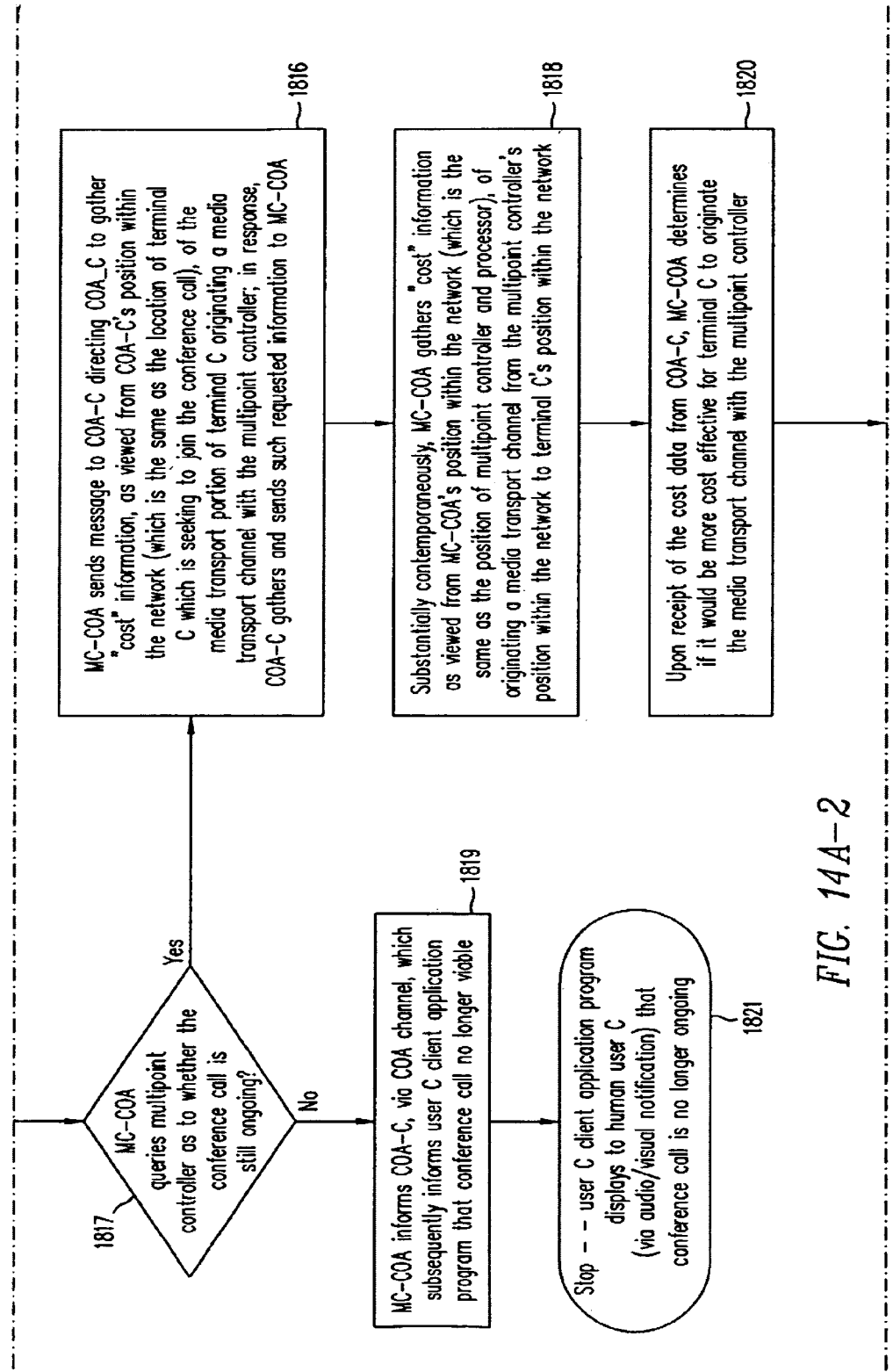
Figure 14B:
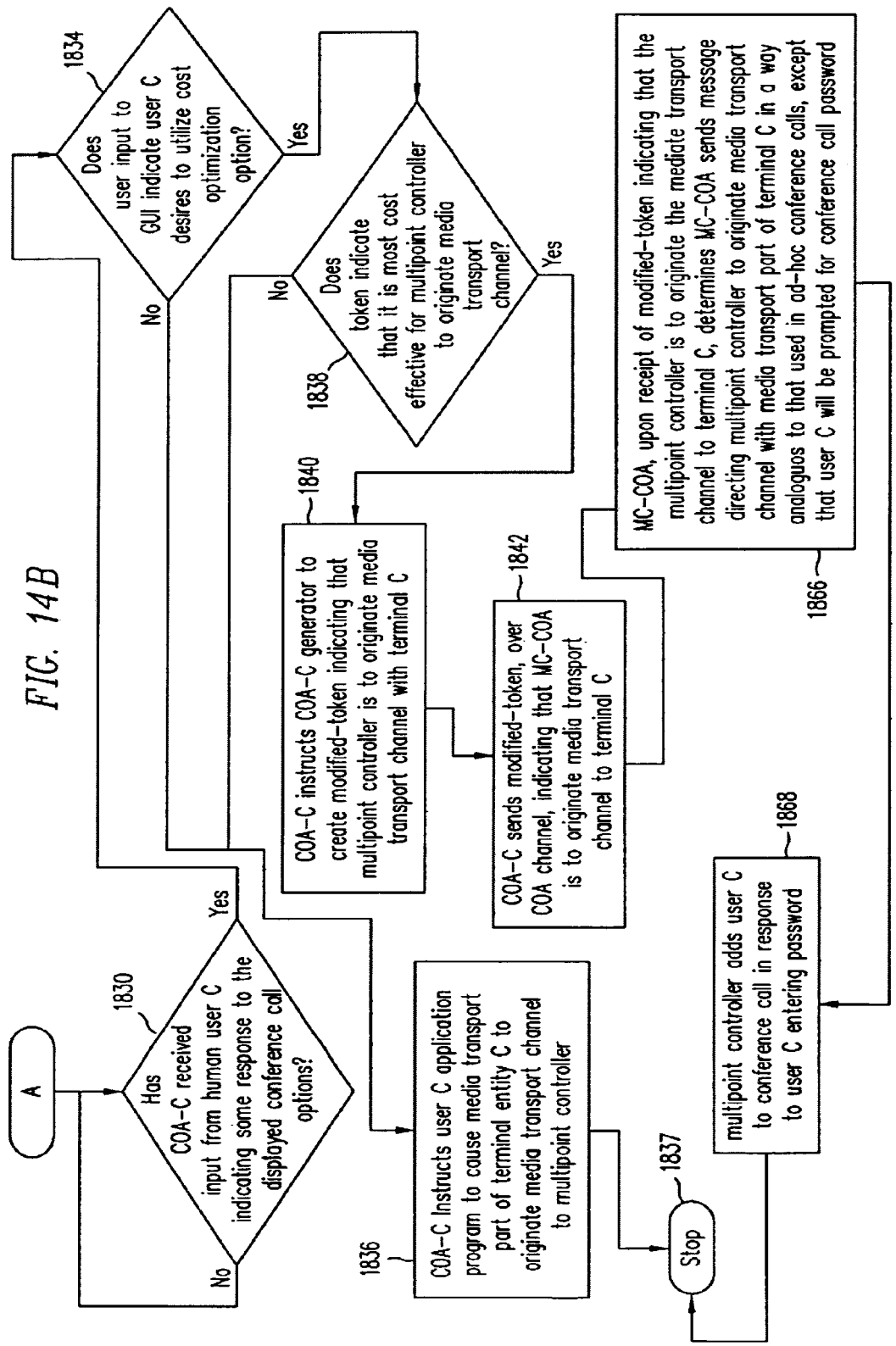

Referring now to FIG. 13, depicted is that media transport channel 144 has been established in a substantially cost-optimized fashion (e.g., in accord with one or more of the actions described in relation to FIGS. 12A and 12B) between multipoint processor 120 (the port of which has been specified by multipoint controller) and media transport part 133 of terminal entity C.

Note that the state of the network in FIG. 13 is substantially the same as that depicted in related-art FIG. 3. However, comparing the series of events depicted in FIGS. 1–3 with the series of events depicted in FIGS. 4–13, it can be seen that the network state reached in FIG. 13 was reached without establishing a media transport channel merely to find out whether the conference call was ongoing, as described in relation to related-art FIG. 2, and that the direction the origination of media transport channel 144 has been achieved in a substantially optimized fashion. This gives significant cost efficiency advantages over the related art.

In addition to the foregoing, also note that foregoing described scheme allows a user desiring to join a meet-me conference call to conference in "as if" the user were being invited to an "ad hoc" conference call in a way that is substantially backwards compatible with existing systems. The way in which this is done is described in detail above and below, but can be summarized as follows. When a terminal attempts to join a "meet-me" conference call, if it is determined to be more advantageous for multipoint controller to call out to the user attempting to join the meet-me conference call, a multipoint controller, through the mechanisms described above and below, invites the user desiring to join the meet-me conference call as if the user were being invited to an ad-hoc conference call. Note that from an existing equipment standpoint, the foregoing is substantially transparent, in that the call manager will be instructed just as it would for any meet-me conference call, and that only a relatively small amount of functionality would need be added to the multipoint controller and terminal of the human user attempting to join the meet-me conference call. Consequently, the scheme described herein has as one of its benefits substantially compatible backwards compatibility with existing systems.

The foregoing discussion has utilized FIGS. 1–13 to demonstrate a device and process for providing a mechanism to allow more cost efficient conference calls. The following is a more formal and enhanced description of the forgoing-described process.

With reference now to FIGS. 14A, 14B, and FIGS. 1–13, depicted is a high-level logic flowchart illustrating in more detail a process by which more cost-efficient conference calls can be achieved. Method step 1800 shows the start of the process. Method step 1802 shows an inquiry as to whether user C client application program has received a request from human user C to join a meet-me conference call (e.g., as was illustrated in FIG. 4 and its supporting text). In the event that the inquiry of method step 1802 yields a determination that user C has not indicated a desire to join a meet-me conference call, depicted is that the process proceeds to method step 1802 (i.e., loops). In the event that the inquiry of method step 1802 yields a determination that user C has indicated a desire to join a meet-me conference call, illustrated is that the process proceeds to method step 1804 wherein it is illustrated the initiation of a Call Optimization Program co-resident with Terminal C (COA-C) such as was illustrated in FIG. 4 and its supporting text. Thereafter, the process proceeds to method step 1806 wherein is shown that the telephone number of the conferencing service maintained by a multi-point controller, plus the conference call password for the conference that user C desires to join, is obtained (e.g., as illustrated in FIG. 4 and its supporting text). Method step 1807 shows the association of the obtained telephone number of the conference call service with a corresponding non-media-transport-supporting connection address, such as was described and illustrated in FIG. 5 and its supporting text. Thereafter, method step 1808 shows that COA-C attempts to establish a COA channel, utilizing the non-media-transport-supporting connection address, with a Cost Optimization Application Program co-resident with the Multipoint Controller (MC-COA). Thereafter, depicted is that the process proceeds to method step 1810 wherein is shown the inquiry as to whether the COA channel was successfully established. In the event that the inquiry of method step 1810 yields a determination that the COA channel was not successfully established, depicted is that the process proceeds to method step 1812 wherein is shown that user C client application program is informed that the COA service is not available. Subsequently, the process proceeds to method step 1814 wherein it is shown that the process stops and that the user C client application program resumes normal operations, functioning as normal in the absence of call optimization (i.e., caller must call into the meet-me conference).

If the inquiry of method step 1810 yields a determination that the COA channel was successfully established, illustrated is that the process proceeds to method step 1815 wherein is depicted that the COA-C sends the obtained telephone number of the conferencing service maintained by the multi-point controller, plus the conference call password for the conference call that user C desires to join, to the MC-COA over the established COA channel.

Thereafter, the process proceeds to method step 1817 wherein is depicted that in response to the telephone number of the conferencing service plus the conference call password for the conference call that user C desires to join, MC-COA queries the multipoint controller as to whether the conference call, associated with the conference call password, is still ongoing. In the event that the inquiry of method step 1817 yields a determination that the conference call is no longer ongoing the process proceeds to 1819 where it is shown that MC-COA, via the COA channel, informs COA-C, which subsequently informs the user C client application program that the conference call associated with the password entered by user C is no longer viable. Thereafter depicted is that the process proceeds to method step 1821 wherein is shown that the process stops and that user C client application program displays to user C the fact that the conference call is no longer viable (e.g. by video or audio notification).

In the event that the inquiry of method step 1817 yields a determination that the conference call associated with the password entered by user C is still ongoing, illustrated is that the process proceeds to method step 1816. Depicted in method step 1816 is that MC-COA send a message to COA-C directing COA-C to gather "cost" information, as viewed from COA-C's position within the network (which is the same as the location of terminal C which is seeking to join the conference call), associated with the media transport portion of terminal C originating a media transport channel with the multipoint controller; further depicted is that in response, COA-C gathers the cost information and send such cost information to MC-COA (e.g. as described and illustrated in FIGS. 6 and 7 and their supporting text). Thereafter, the process proceeds to method step 1818 wherein is shown that, substantially contemporaneously with method step 1816, MC-COA gathers "cost" information, as viewed from MC-COA's position within the network (which is the same as the position of the multipoint controller and multipoint processor), associated with originating a media transport channel from the multipoint controller's position within the network to terminal C's position within the network (e.g., as described and illustrated in FIG. 8 and its supporting text). Method step 1820 shows that upon this receipt of the cost data (described in method step 1816) from COA-C, MC-COA determines if it would be more cost effective for terminal C to originate the media transport channel with the multipoint controller, as opposed to vise versa.

Method step 1822 shows that MC-COA directs MC-COA token generator to generate a token which contains information indicating whether the conference call is still ongoing; in addition, if it has been determined that it is more cost effective for terminal C to originate the media transport channel with the multipoint controller, the token will contain information indicating that also. Thereafter, method step 1824 shows that MC-COA sends the created token to COA-C over the previously established COA channel.

Method step 1826 shows that upon receipt of the token, COA-C passes the token to it's COA-C token processor, which decodes the information contained within the token, after which COA-C token processor sends a message to COA-C informing COA-C of the decoded information (e.g., as was described and illustrated in FIG. 9 and its supporting text).

Subsequent to decoding the information contained within the received token, method step 1828 shows that COA-C presents (e.g. via audio and/or visual notification) various conference call options to human user C. Depicted is that, in a first option, user C is queried as to whether he will accept a media transport channel originated from the conference call controller, if that is more cost effective, rather than user C originating the media transport channel. Depicted is that, in a second option, also presented to user C, user C is queried as to whether he wants to initiate the media transport channel to conference call controller, irrespective of cost optimization criteria, from user C's terminal.

Figures 2, 10B:
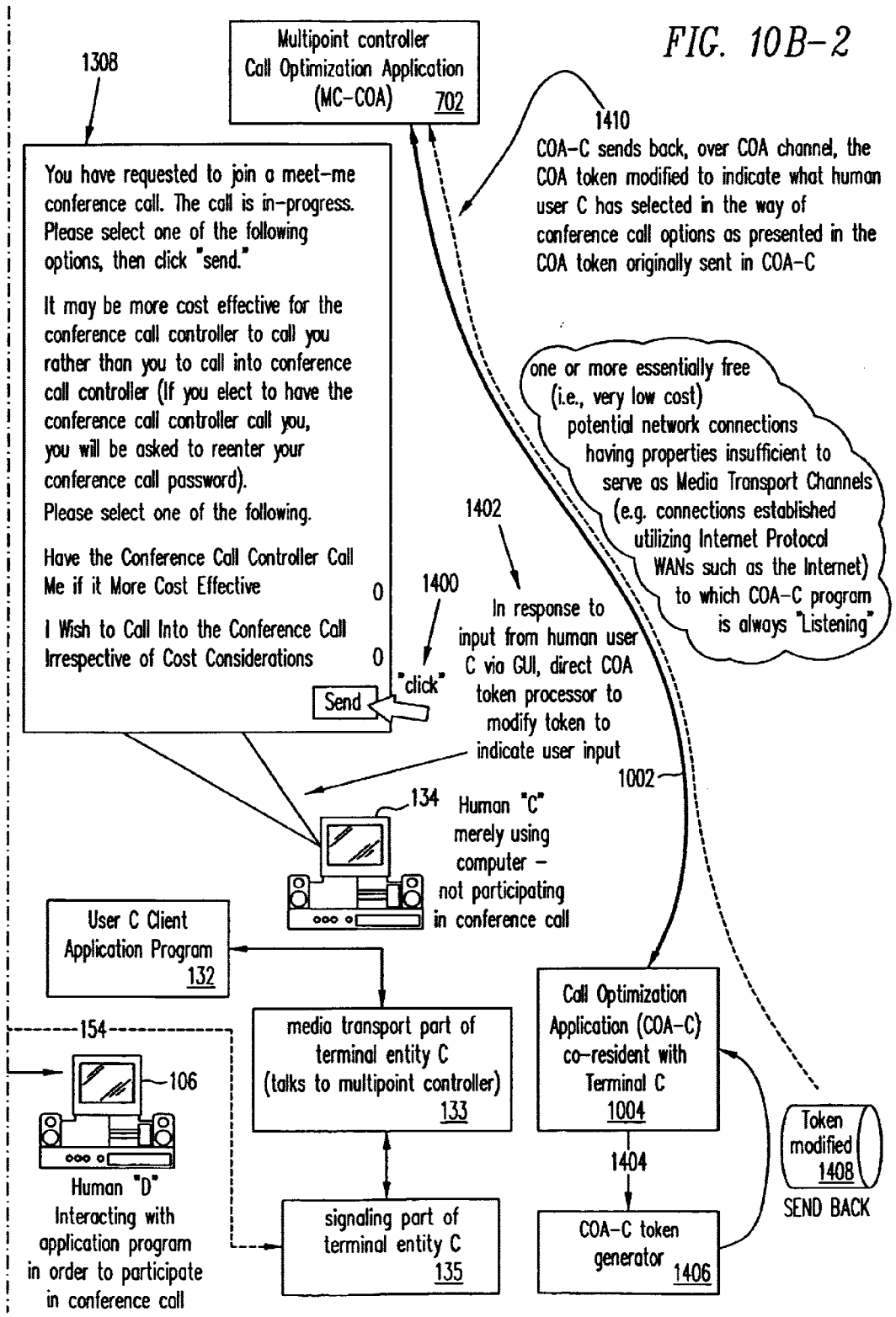

Method step 1830 depicts an inquiry as to whether COA-C has received input from human user C indicating some response to the displayed invitation to join the conference call; for example, input generated by human user C selecting fields and clicking a send button such as was illustrated and described in FIG. 10 and its supporting text. In the event that no such input from human user C has been yet received, depicted is that the process proceeds to method step 1830 (i.e., loops). In the event that the inquiry depicted in method step 1830 yields a determination that COA-C has received input from human user C indicating some response to the displayed conference call options, depicted is that the process proceeds to method step 1834 wherein is shown the inquiry as to whether user C's input shows that user C desires to utilize the cost optimization option.

In the event that the inquiry of method step 1834 yields a determination that user C's input indicates that user C does not desire to utilize the cost optimization option, illustrated is that the process proceeds to method step 1836 wherein is shown that COA-C instructs user C application program to cause the media transport part of terminal entity C to originate a media transport channel with the multi-point controller. Thereafter, the process proceeds to method step 1837 and stops. In the event that the inquiry of method step 1834 yields a determination that user C does desire to utilize the cost optimization option, the process proceeds to method step 1838 wherein is shown the inquiry as to whether the token received (i.e., as described in method step 1826) indicates that it is most cost effective for the multi-point controller to originate the immediate transport channel.

In the event that the inquiry of method step 1838 yields a determination that it is not most cost effective for the multi-point controller to originate the immediate transport channel depicted is that the process proceeds to method step 1836; thereafter, the process proceeds as has been described previously. In the event that the inquiry of method step 1838 yields a determination that the token received (i.e., as described in method step 1826) does indicate that it is most cost effective for the multi-point controller to originate the immediate transport channel, shown is that the process proceeds to method step 1840 wherein is depicted that the COA-C instructs the COA-C token generator to create a modified token indicating that multipoint controller is to originate media transport channel with terminal C.

Thereafter, the process proceeds to method step 1842, wherein it is shown that COA-C sends the modified-token, over the COA channel, indicating that MC-COA is to originate media transport channel to terminal C. Thereafter, the process proceeds to method step 1866.

Method step 1866 depicts that MC-COA sends a message to the multi-point controller directing the multi-point controller to originate a media transport channel with the media transport part of terminal C in a way analogous to that used in ad hoc conference calls, except that user C will be prompted for the conference call password subsequent to initiation and establishment of the media transport channel. Thereafter, depicted is that the process proceeds to method step 1868, wherein is shown that the multipoint controller adds terminal C into the conference call subsequent to user C entering the password for the conference call. Thereafter, shown is that the process proceeds to method 1837 and stops.

Other Embodiments

The preceding discussion has described processes and devices in the context of an meet-me mode conference call wherein a token is passed. Those having skill in the art will recognize that such token may be passed directly or by reference.

The foregoing discussion has described the establishment and use of a COA channel via addressees. In another embodiment, such COA channels can be augmented by use of a commercially available instant messaging service. For example, insofar as some users do not have permanent Internet Protocol addresses (e.g., users of large commercial Internet Service Providers), in other embodiments, the COA channel can be established via use of the instant messaging service, which can be achieved by the addition of such usernames to the directory 902 as non-media-transport-channel-supporting connection addresses. Thereafter, such usernames can be used to resolve the telephone number of the conference call service maintained by multipoint controller 118 to an instant messaging username of a user having a of computer housing multipoint controller. Subsequently, once such instant messaging channel has been established, communication will occur in a fashion substantially analogous to the communication described above with respect to the COA channels, except that such communication takes place over the instant messaging service. The modifications required to the above-described system to make use of such commercially available instant messaging systems are well within the skill of one having ordinary skill in the art.

The foregoing detailed description has set forth various embodiments of the present invention via the use of block diagrams, flowcharts, and examples. It will be understood as notorious by those within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using either synchronous or asynchronous communication links (e.g., TDM, packet, ATM, frame based communications links, or any combination of the foregoing described links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes but is not limited to electrical circuitry having at least one discrete electrical circuit, electrical circuitry having at least one integrated circuit, electrical circuitry having at least one application specific integrated circuit, electrical circuitry forming a general purpose computing device configurable by a computer program (e.g., a general purpose computer configurable by a computer program or a microprocessor configurable by a computer program), electrical circuitry forming a memory device (e.g., any and all forms of random access memory), and electrical circuitry forming a communications device (e.g., a modem, communications switch, or optical-electrical communications devices).

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

Other embodiments are within the following claims.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such limitation is present. For non-limiting example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when same claim includes the introductory phrases "one or more" or "at least one" and indefinite articles such as "a" or "an"; the same holds true for the use of definite articles used to introduce claim elements.

What is claimed is:

1. A method for joining a meet-me conference call, said method comprising:

establishing a Call Optimization Application (COA) channel between a Multipoint Controller-Call Optimization Application (MC-COA) and a Call Optimization Application co-resident with a terminal (Terminal-COA) following an address resolution, in response to an application program co-resident with a terminal receiving a request to join an ongoing meet-me conference call;

receiving, over the COA channel, a first message from the MC-COA as to whether the meet me conference call is still ongoing; and in response to the first message indicating that the meet-me conference call is no longer ongoing, giving notification that the meet-me conference call is no longer ongoing.

2. The method of claim 1, wherein said establishing a Call Optimization Application (COA) channel further comprises:

determining that the COA channel cannot be established;

providing notification that Call Optimization is unavailable; and terminating the call optimization operations and resuming normal operations, whereby substantially backwards compatibility with existing communications systems is achieved.

3. The method of claim 1, wherein the receiving a request to join an ongoing meet-me conference call further includes:

receiving a telephone number of a conferencing service and a password for a conference call.

4. The method of claim 1, further comprising:

in response to the first message indicating that the meet me conference call is still ongoing:

exchanging cost information data between the Terminal-COA and the MC-COA; and in response to user input and the exchanged cost information data, establishing a media transport channel.

5. The method of claim 4, wherein said exchanging cost information data between the Terminal-COA and the MC-COA further includes:

gathering, with the Terminal-COA, cost information related to the first terminal originating the media transport channel.

6. The method of claim 4, wherein said establishing a media transport channel further includes:

in response to the user input indicating that the user desires to join the meet-me conference call in a substantially cost-optimal fashion:

originating a media transport channel from the user's terminal in response to the first message indicating user terminal origination is substantially cost optimal; or sending a second message, over the COA channel, to the MC-COA indicating that the multipoint controller is to originate the media transport channel, in response to the first message indicating multipoint controller origination is substantially cost optimal.

7. The method of claim 1, wherein said establishing a Call Optimization Application (COA) channel further includes:
   obtaining a connection address of the terminal to be added; and
   associating the obtained connection address with a non-media-transport-channel-supporting connection address.

8. The method of claim 1, wherein said establishing a Call Optimization Application (COA) channel further includes:
   establishing an Internet Protocol channel.

9. A system for joining a meet-me conference call, said system comprising:
   means for establishing a Call Optimization Application (COA) channel between a Multipoint Controller-Call Optimization Application (MC-COA) and a Call Optimization Application co-resident with a terminal (Terminal-COA) following an address resolution, in response to an application program co-resident with a terminal receiving a request to join an ongoing meet-me conference call;
   means for receiving, over the COA channel, a first message from the MC-COA as to whether the meet me conference call is still ongoing; and
   means, responsive to the first message indicating that the meet me conference call is no longer ongoing, for giving notification that the meet-me conference call is no longer ongoing.

10. The system of claim 9, wherein said means for establishing a Call Optimization Application (COA) channel further comprises:
    means for determining that the COA channel cannot be established;
    means for providing notification that Call Optimization is unavailable; and
    means for terminating the call optimization operations and resuming normal operations,
    whereby substantially backwards compatibility with existing communications systems is achieved.

11. The system of claim 9, wherein the receiving a request to join an ongoing meet-me conference call further includes:
    receiving a telephone number of a conferencing service and a password for a conference call.

12. The system of claim 9, further comprising:
    means, responsive to the first message indicating that the meet-me conference call is still ongoing, for exchanging cost information data between the Terminal-COA and the MC-COA; and
    means, responsive to user input and the exchanged cost information data, for establishing a media transport channel.

13. The system of claim 12, wherein said means for exchanging cost information data between the Terminal-COA and the MC-COA further includes:
    means for gathering, with the Terminal-COA, cost information related to the first terminal originating the media transport channel.

14. The system of claim 12, wherein said means for establishing a media transport channel further includes:
    means, responsive to the user input indicating that the user desires to join the meet-me conference call in a substantially cost-optimal fashion for:
       originating a media transport channel from the user's terminal in response to the first message indicating user terminal origination is substantially cost optimal; or
       sending a second message, over the COA channel, to the MC-COA indicating that the multipoint controller is to originate the media transport channel, in response to the first message indicating multipoint controller origination is substantially cost optimal.

15. The system of claim 9, wherein said means for establishing a Call Optimization Application (COA) channel further includes:
    means for obtaining a connection address of the terminal to be added; and
    means for associating the obtained connection address with a non-media-transport-channel-supporting connection address.

16. The system of claim 9, wherein said means for establishing a Call Optimization Application (COA) channel further includes:
    means for establishing an Internet Protocol channel.

17. A program product comprising:
    computer readable media storing programming adapted to establish a Call Optimization Application (COA) channel between a Multipoint Controller-Call Optimization Application (MC-COA) and a Call Optimization Application co-resident with a terminal (Terminal-COA) following an address resolution, in response to an application program co-resident with a terminal receiving a request to join an ongoing meet-me conference call; programming adapted to receive, over the COA channel, a first message from the MC-COA as to whether the meet-me conference call is still ongoing; and programming, responsive to the first message indicating that the meet-me conference call is no longer ongoing, adapted to give notification that the meet-me conference call is no longer ongoing.

18. The program product of claim 17, wherein said computer readable media comprises recordable media.

19. A method for adding a participant to a conference call, said method comprising:
    querying a multipoint controller as to whether the meet-me conference call is still ongoing, in response to receiving a first message, over a Call Optimization Channel (COA), from a Call Optimization Application co-resident with a terminal (Terminal-COA), that a user desires to join a meet-me conference call; and
    sending a message, containing results of said querying, over the COA channel.

20. The method of claim 19 further comprising:
    in response to said querying showing that the meet-me conference call is viable and receipt of a second message indicating that the user desires to take advantage of a substantial cost optimization option:
       gathering cost information related to origination of a media transport channel;
       determining whether it is more cost optimal for the user's terminal to originate a media transport channel to the multipoint controller; and
       in response to a determination that the cost information indicates that it is more cost optimal for the user's terminal to originate a media transport channel to the multipoint controller, sending a message to the COA-terminal, over the COA channel, containing instruction that it is substantially cost optimal for the user's terminal to originate the media transport channel;
       in response to a determination that the cost information indicates that it is not more cost optimal for the user's terminal to originate a media transport channel to the multipoint controller, sending a message to the multipoint controller containing instruction that it is more cost optimal for the multipoint controller to originate a media transport channel with a Call Optimization Application co-resident with the user's terminal (Terminal-COA).

21. The method of claim 20, wherein said gathering cost information related to origination of a media transport channel further includes:

receiving, from the Terminal-COA, cost information related to the user's terminal originating the media transport channel.

22. The method of claim 20, wherein said gathering cost information related to origination of a media transport channel further includes:

gathering, with a multipoint controller-Cost Optimization Application (MC-COA), cost information related to the multipoint controller originating the media transport channel.

23. The method of claim 20, wherein said determining whether it is more cost optimal for the user's terminal to originate a media transport channel to the multipoint controller further includes:

comparing, by a multipoint controller-Cost Optimization Application (MC-COA), cost information.

24. A system for adding a participant to a conference call, said system comprising:

means for querying a multipoint controller as to whether the meet-me conference call is still ongoing, in response to receiving a first message, over a Call Optimization Channel (COA), from a Call Optimization Application co-resident with a terminal (Terminal-COA), that a user desires to join a meet-me conference call; and means for sending results obtained by said means for querying over the COA channel.

25. The system of claim 24, further comprising:

means, responsive to querying showing that the meet-me conference call is viable and receipt of a second message indicating that the user desires to take advantage of a substantial cost optimization option, for:

gathering cost information related to origination of a media transport channel;

determining whether it is more cost optimal for the user's terminal to originate a media transport channel to the multipoint controller; and in response to a determination that the cost information indicates that it is more cost optimal for the user's terminal to originate a media transport channel to the multipoint controller, sending a message to the COA-terminal, over the COA channel, containing instruction that it is substantially cost optimal for the user's terminal to originate the media transport channel;

in response to a determination that the cost information indicates that it is not more cost optimal for the user's terminal to originate a media transport channel to the multipoint controller, sending a message to the multipoint controller containing instruction that it is more cost optimal for the multipoint controller to originate a media transport channel with a Call Optimization Application co-resident with the user's terminal (Terminal-COA).

26. The system of claim 25, wherein said means for gathering cost information related to origination of a media transport channel further includes:

means for receiving, from the Terminal-COA, cost information related to the user's terminal originating the media transport channel.

27. The system of claim 25, wherein said means for gathering cost information related to origination of a media transport channel further includes:

means for gathering, with the MC-COA, cost information related to the multipoint controller originating the media transport channel.

28. The system of claim 25, wherein said means for determining whether it is more cost optimal for the user's terminal to originate a media transport channel to the multipoint controller further includes:

means for a multipoint controller-cost optimization application to compare cost information.

29. A program product comprising:

computer readable media storing programming adapted to query a multipoint controller as to whether the meet-me conference call is still ongoing, in response to receiving a first message, over a Call Optimization Channel (COA), from a Call Optimization Application co-resident with a terminal (Terminal-COA), that a user desires to join a meet-me conference call; and programming adapted to send results obtained by said programming adapted to query over the COA channel.

30. The program product of claim 29, wherein said computer readable media comprises recordable media.

31. A system, comprising:

an application program co-resident with a terminal; and a call optimization application, wherein the call optimization application is configured to establish a call optimization application channel in response to the application program co-resident with the terminal receiving a request to join a meet-me conference call;

the call optimization application is configured to provide an indication that the meet-me conference call is no longer ongoing if information received via the call optimization application channel indicates that the meet-me conference call is no longer ongoing.

32. The system of claim 31, wherein the call optimization application is configured to provide an indication that call optimization is unavailable if the call optimization application is unable to open the call optimization application channel.

33. The system of claim 31, wherein the call optimization application is configured to receive a conference call telephone number and a password for the meet-me conference call from the application program.

34. The system of claim 33, wherein the call optimization application is configured to send the conference call telephone number and the password to a multipoint controller-call optimization application via the call optimization application channel.

35. The system of claim 31, wherein if the information received via the call optimization application channel indicates that the meet-me conference call is still ongoing, the call optimization application is configured to exchange cost information data with a multipoint controller-call optimization application via the call optimization application channel; and in response to user input and the cost information data, the terminal is configured to establish a media transport channel.

36. The system of claim 35, wherein the call optimization application is configured to gather cost information related to the terminal originating the media transport channel as part of exchanging cost information with the multipoint controller-call optimization application.

37. The system of claim 35, wherein in response to a user indicating that the user desires to join the meet-me conference call in a substantially cost-optimal fashion, the terminal is configured to:
  originate a media transport channel if the cost information, exchanged via the call optimization application channel, indicates that user terminal connection origination is substantially cost optimal;
  send information, over the call optimization application channel, indicating that the multipoint controller-call optimization application is to originate the media transport channel if the cost information, exchanged via the call optimization application channel, indicates that multipoint controller origination is substantially cost optimal.

38. The system of claim 31, wherein the call optimization application is configured to obtain a connection address of the terminal and associate the connection address with the call optimization application channel as part of establishing the call optimization application channel.

39. The system of claim 31, wherein the call optimization application is configured to establish an Internet Protocol channel as part of establishing the call optimization application channel.

40. A system, comprising:

a multipoint controller; and a multipoint controller call optimization application, wherein the multipoint controller call optimization application is configured to receive, via a call optimization application channel, information indicating that a user terminal is requesting to join a meet-me conference call;

the multipoint controller call optimization application is configured to provide information to a user application co-resident with the user terminal, via the call optimization application channel, indicating whether the meet-me conference call is still ongoing.

41. The system of claim 40, wherein in response to the meet-me conference call being still ongoing and information, received via the call optimization application channel, indicating that a user desires to take advantage of a substantial cost optimization option, the multipoint controller call optimization application is configured to:
  gather cost information related to origination of a media transport channel, wherein the cost information indicates whether it is more cost optimal for the user terminal to originate the media transport channel than for the multipoint controller to originate the media transport channel; and in response to the cost information indicating that it is more cost optimal for the user terminal to originate the media transport channel to the multipoint controller, send information to the user terminal, via the call optimization application channel, indicating that it is substantially cost optimal for the user terminal to originate the media transport channel;

in response to the cost information indicating that it is not more cost optimal for the user terminal to originate the media transport channel to the multipoint controller, sending information to the multipoint controller indicating that it is more cost optimal for the multipoint controller to originate the media transport channel.

42. The system of claim 41, wherein as part of gathering the cost information, the multipoint controller call optimization application is configured to receive, via the call optimization application channel, cost information related to the user terminal originating the media transport channel.

43. The system of claim 41, wherein as part of gathering the cost information, the multipoint controller call optimization application is configured to gather cost information related to the multipoint controller originating the media transport channel.

44. The method of claim 41, wherein the multipoint controller cost optimization application is configured to compare cost information related to the multipoint controller originating a media transport channel to cost information related to the user terminal originating the media transport channel to determine whether it is more cost optimal for the user terminal to originate the media transport channel.

* * * * *

UNITED STATES PATENT AND TRADEMARK OFFICE
CERTIFICATE OF CORRECTION

PATENT NO. : 6,694,351 B1
DATED : February 17, 2004
INVENTOR(S) : Shaffer et al.

It is certified that error appears in the above-identified patent and that said Letters Patent is hereby corrected as shown below:

Column 22,
Line 39, the phrase "The method" should read -- The system --.

Signed and Sealed this

Second Day of August, 2005

JON W. DUDAS
*Director of the United States Patent and Trademark Office*